(12) United States Patent
Scadden et al.

(10) Patent No.: US 7,490,994 B2
(45) Date of Patent: *Feb. 17, 2009

(54) HYBRID FIBER/COPPER CONNECTOR SYSTEM AND METHOD

(75) Inventors: Jarrod Scadden, Waconia, MN (US); M'Hamed Anis Khemakhem, Eden Prairie, MN (US); Jeffrey Louis Peters, Eagan, MN (US); Kenneth Allen Skluzacek, Belle Plaine, MN (US); Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/787,197

(22) Filed: Apr. 13, 2007

(65) Prior Publication Data

US 2008/0124030 A1 May 29, 2008

Related U.S. Application Data

(63) Continuation-in-part of application No. 11/606,793, filed on Nov. 29, 2006.

(51) Int. Cl.
*G02B 6/38* (2006.01)
(52) U.S. Cl. .............................. 385/62; 385/58; 385/77; 385/81
(58) Field of Classification Search .................... 385/53, 385/56, 75, 76, 101
See application file for complete search history.

(56) References Cited

U.S. PATENT DOCUMENTS 4,296,992 A * 10/1981 Gallagher .................. 439/589

| 4,373,777 A | 2/1983 | Borsuk et al. |
| 4,449,784 A | 5/1984 | Basov et al. |
| 4,568,145 A | 2/1986 | Colin et al. |
| 4,611,887 A | 9/1986 | Glover et al. |
| 4,728,171 A | 3/1988 | Schofield et al. |
| 5,109,452 A | 4/1992 | Selvin et al. |
| 5,242,315 A | 9/1993 | O'Dea |
| 5,745,622 A | 4/1998 | Birnbaum et al. |

(Continued)

FOREIGN PATENT DOCUMENTS

DE 202 02 835 U1 3/2003

(Continued)

OTHER PUBLICATIONS

Telecast Fiber Systems, Inc., SHED™, SMPTE Hybrid Elimination Devices, 2003, pp. 1-2.

(Continued)

*Primary Examiner*—Sarah Song
(74) *Attorney, Agent, or Firm*—Merchant & Gould P.C.

(57) ABSTRACT

A hybrid fiber/copper connector assembly which permits repair of damaged fibers or copper conductors carried by a hybrid fiber/copper cable without requiring replacement of the entire connector assembly or the cable is disclosed. The hybrid fiber/copper connector assembly disclosed also allows individual hybrid fiber/copper connectors of the assembly to be converted from one gender to a different gender. The hybrid fiber/copper connector assembly disclosed also allows the individual hybrid fiber/copper connectors of the assembly to be converted from being hybrid fiber/copper connectors to being only fiber connectors or only copper connectors.

32 Claims, 29 Drawing Sheets

U.S. PATENT DOCUMENTS

| | | |
|---|---|---|
| 5,883,995 A | 3/1999 | Lu |
| 5,982,971 A | 11/1999 | Amirkalali |
| 6,115,159 A | 9/2000 | Baker |
| 6,142,676 A | 11/2000 | Lu |
| 6,234,683 B1 | 5/2001 | Waldron et al. |
| 6,254,278 B1 | 7/2001 | Andrews et al. |
| 6,357,931 B1 | 3/2002 | Shirakawa et al. |
| 6,475,009 B2 | 11/2002 | Below et al. |
| 6,478,625 B2 | 11/2002 | Tolmie et al. |
| 6,575,786 B1 | 6/2003 | Khemakhem et al. |
| 6,579,014 B2 | 6/2003 | Melton et al. |
| 6,612,857 B2 | 9/2003 | Tolmie |
| 6,648,520 B2 | 11/2003 | McDonald et al. |
| 6,719,461 B2 | 4/2004 | Cull |
| 6,733,185 B2 | 5/2004 | Zhao et al. |
| 6,739,759 B1 | 5/2004 | Seeley |
| 6,811,323 B2 | 11/2004 | Murray et al. |
| 6,846,988 B2 | 1/2005 | Khemakhem et al. |
| 6,856,748 B1 | 2/2005 | Elkins et al. |
| 6,962,445 B2 | 11/2005 | Zimmel et al. |
| 7,111,990 B2 | 9/2006 | Melton et al. |
| 2004/0052472 A1 | 3/2004 | Roth et al. |
| 2006/0056769 A1 | 3/2006 | Khemakhem et al. |
| 2006/0233496 A1 | 10/2006 | Khemakhem et al. |

FOREIGN PATENT DOCUMENTS

| | | |
|---|---|---|
| EP | 0 204 581 A2 | 12/1986 |
| EP | 0 803 749 A1 | 10/1997 |
| EP | 0 996 011 A1 | 4/2000 |
| EP | 0 996 012 A1 | 4/2000 |
| EP | 1 221 630 A2 | 7/2002 |
| GB | 2 154 333 A | 9/1985 |
| WO | WO 86/00147 | 1/1986 |
| WO | WO 2006/039084 A1 | 4/2006 |

OTHER PUBLICATIONS

Telecast Fiber Systems, Inc., Cobra™, Triax-to-Fiber Camera Interface—Now for High Definition and High Speed Cameras, 2003, pp. 1-2.

LEMO® USA, Inc., LEMO's Audio Video Connectors—Coax, Triax, Fiber Optic and Hybrid Applications, 2003, pp. 1-51.

Lemo 3K.93C Series Connector Brochure, undated, 22 pages.

International Search Report and Written Opinion mailed Jun. 25, 2008.

International Search Report and Written Opinion mailed Jul. 2, 2008.

International Search Report and Written Opinion mailed Sep. 17, 2008.

\* cited by examiner

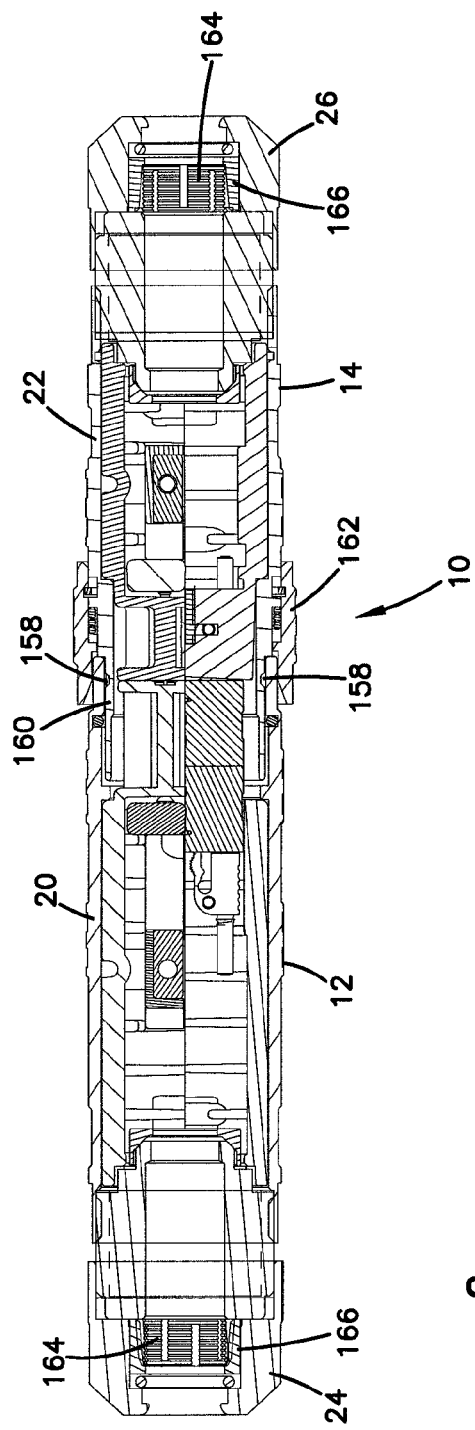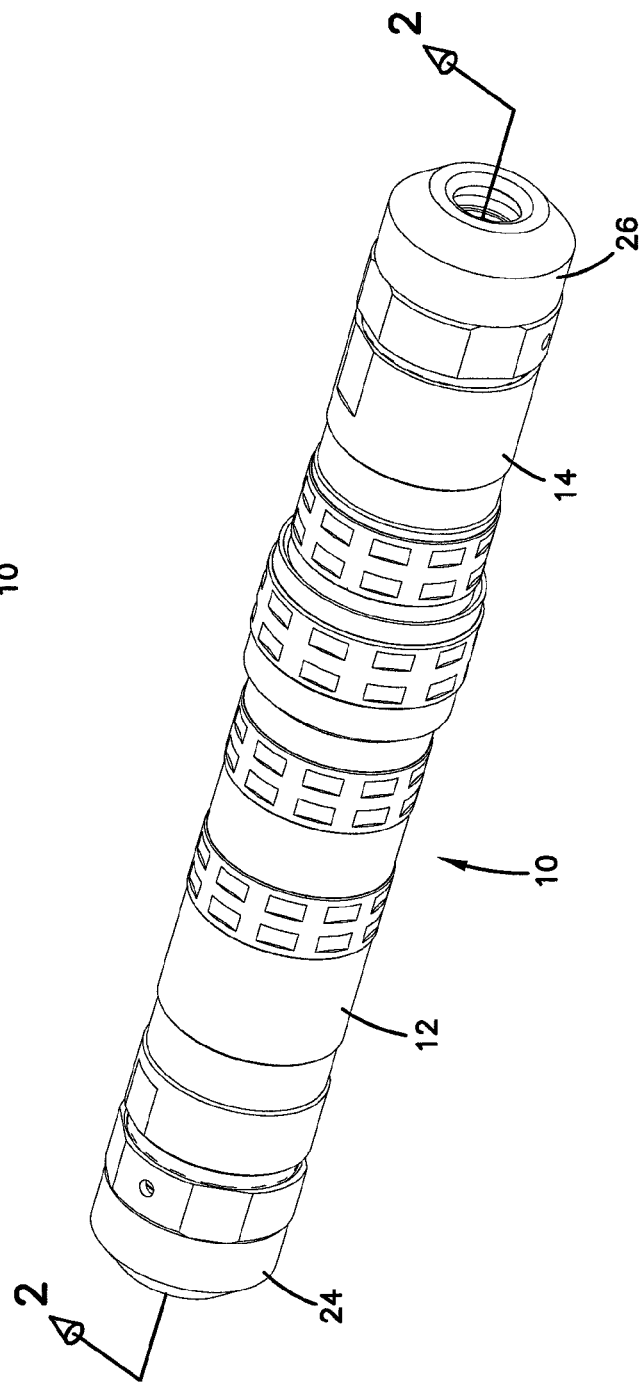

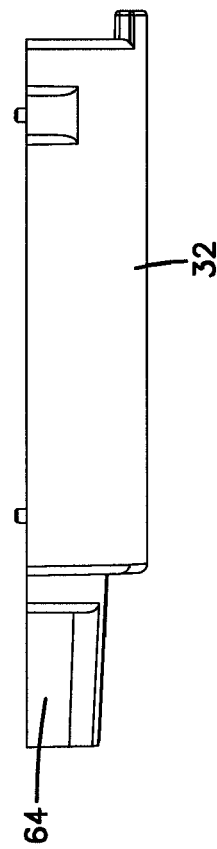
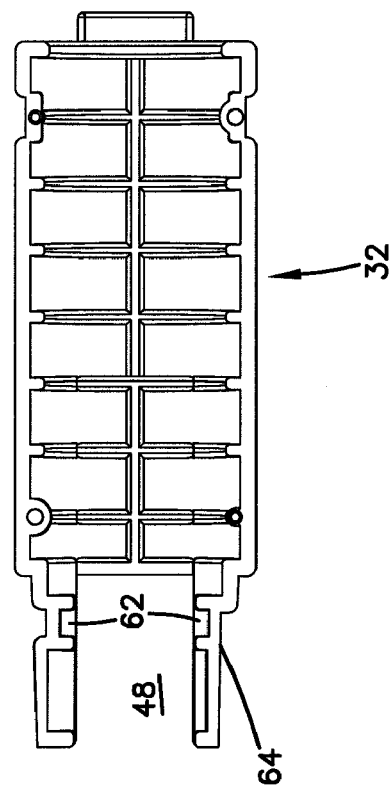
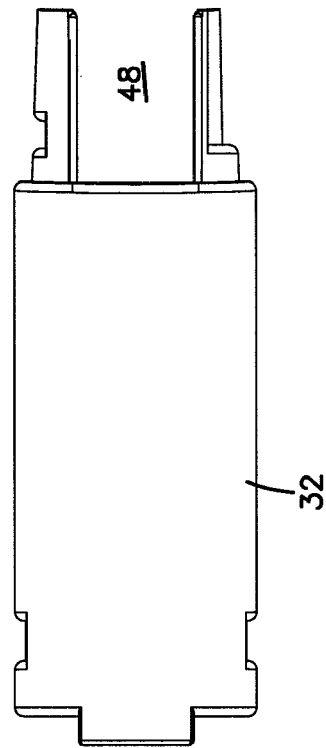
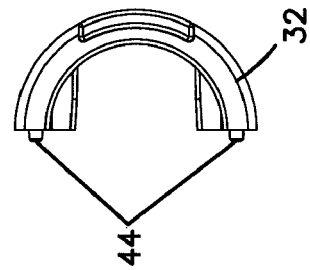
FIG.8
FIG.7
FIG.6
FIG.9

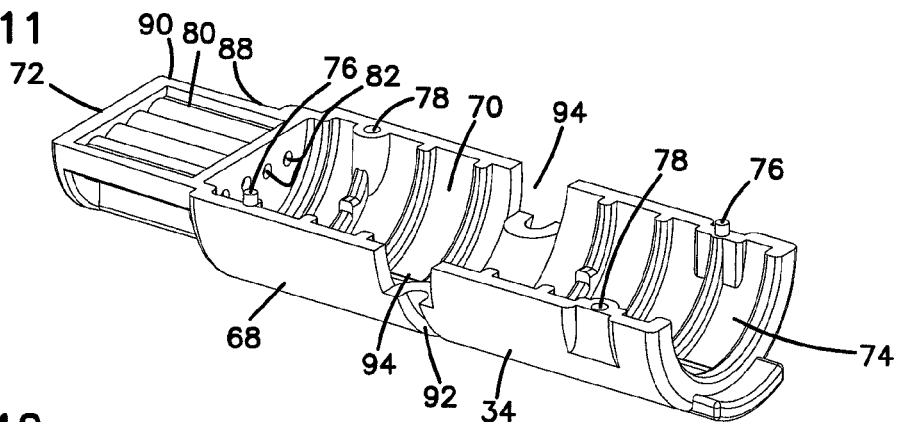
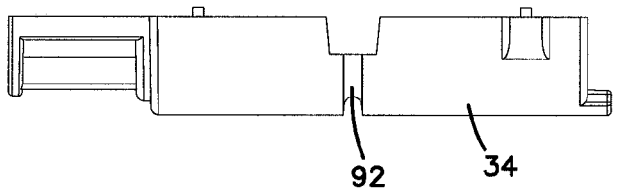
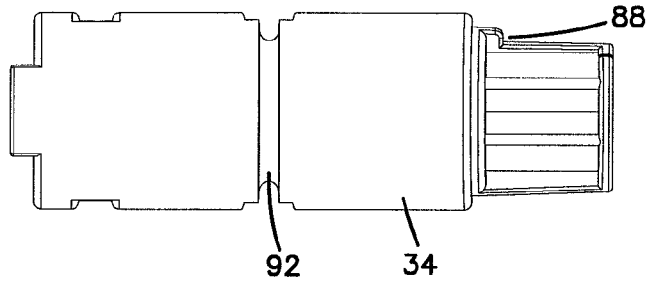
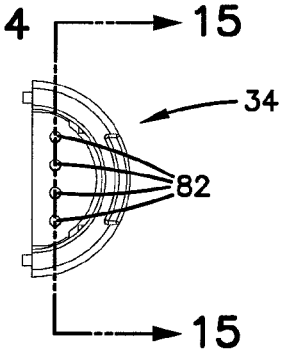
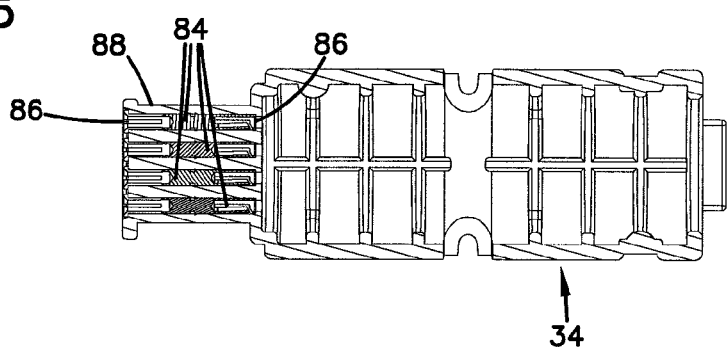

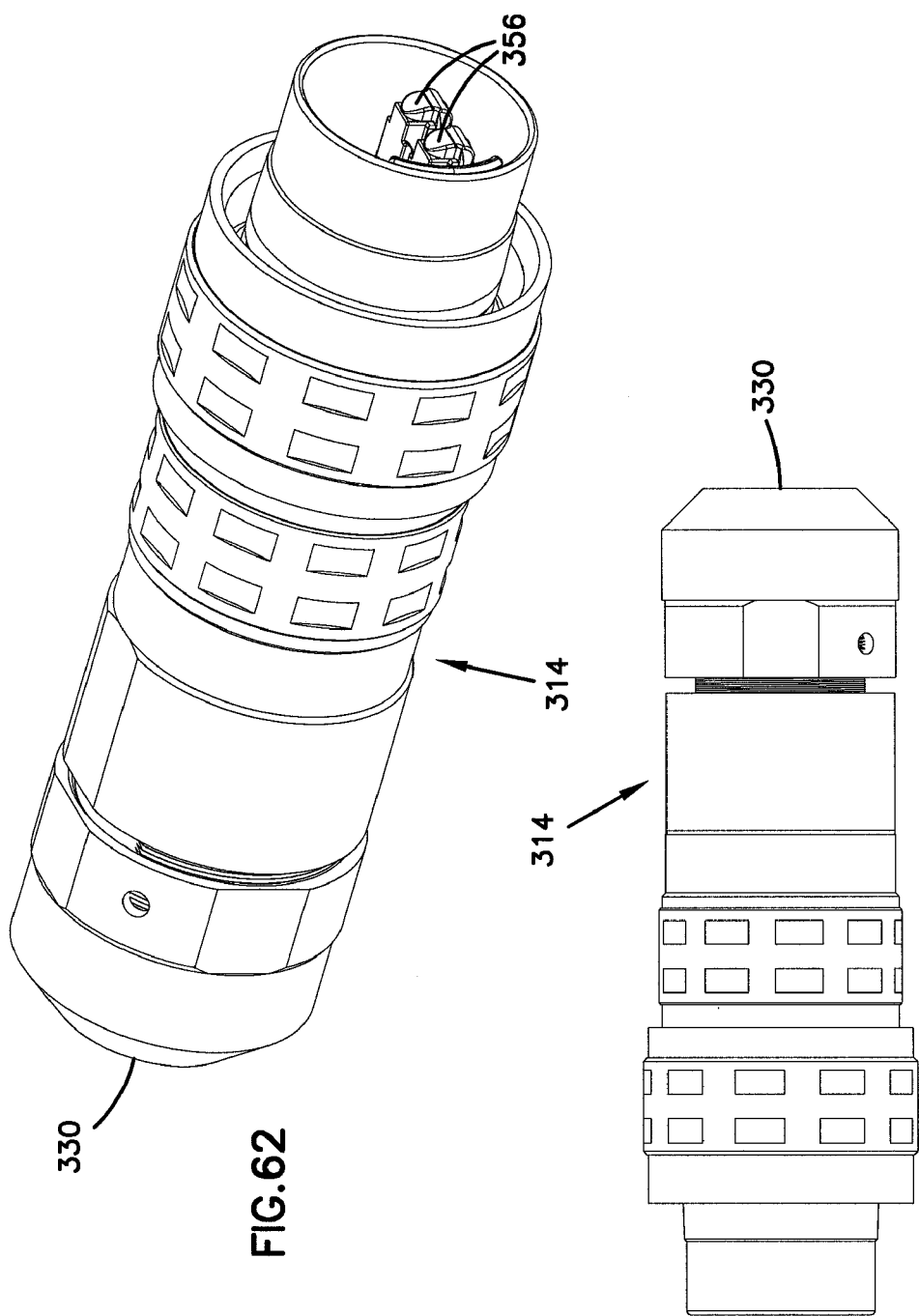

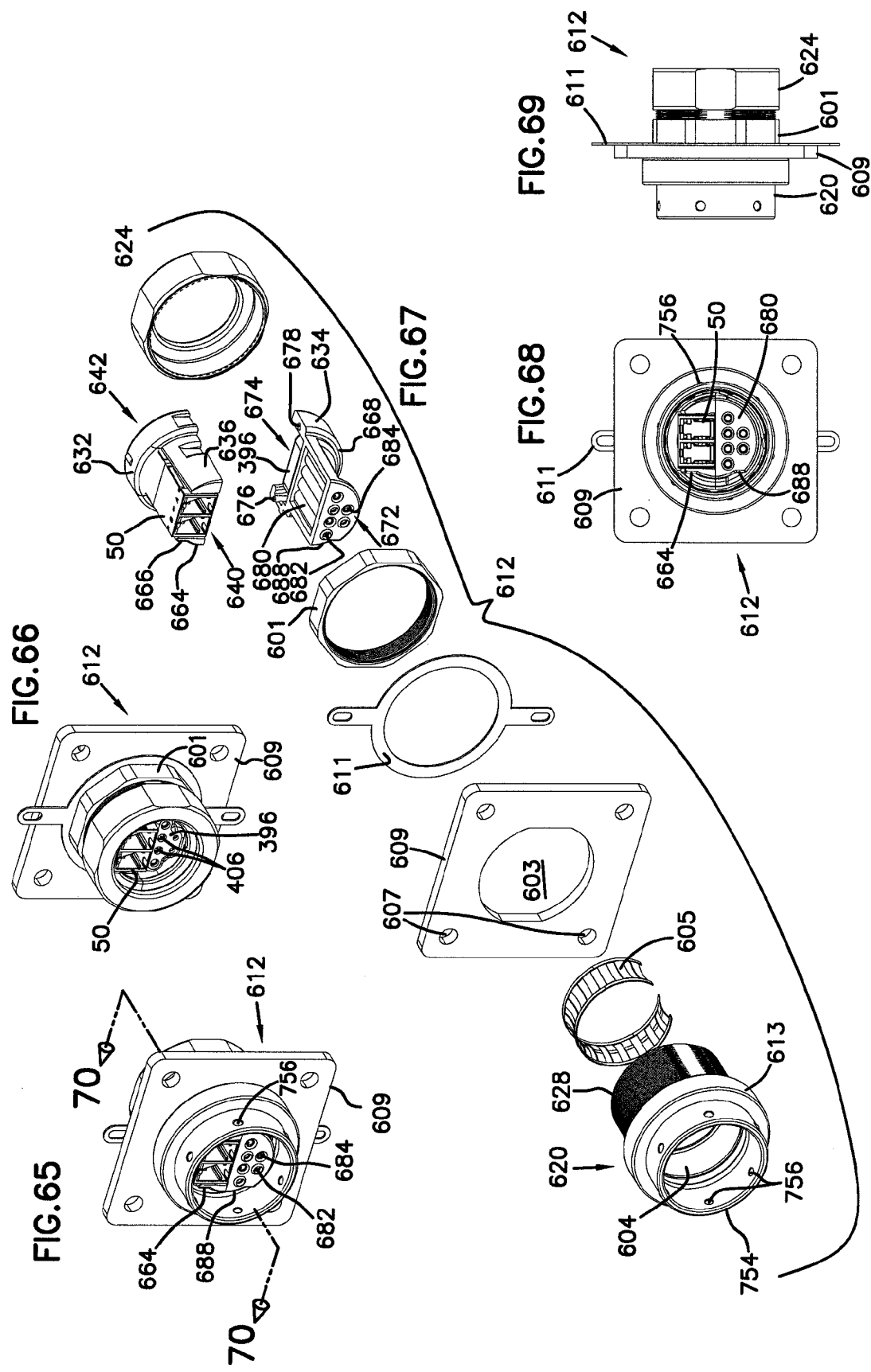

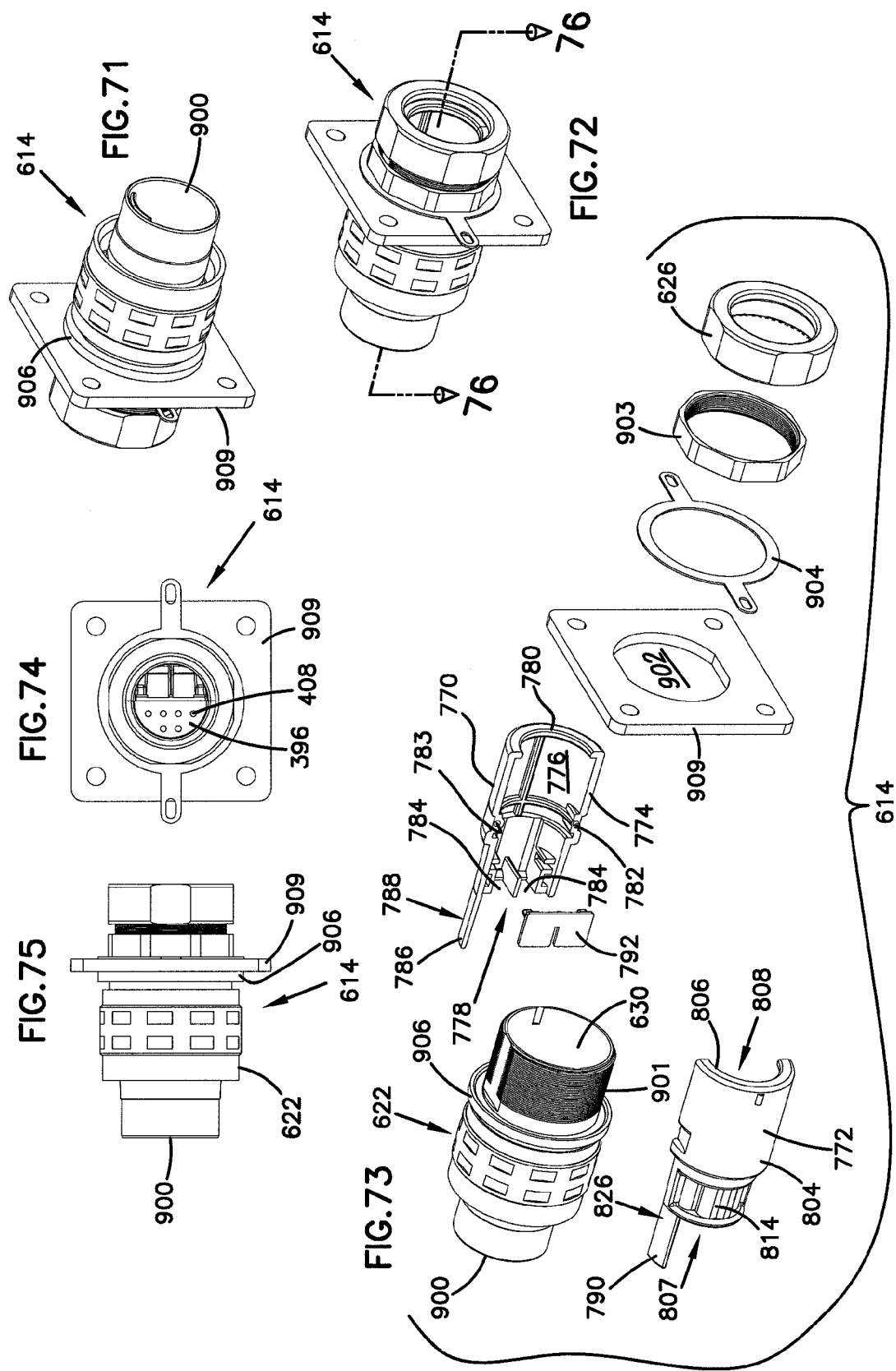

HYBRID FIBER/COPPER CONNECTOR SYSTEM AND METHOD

CROSS REFERENCE TO RELATED APPLICATION(S)

This application is a continuation-in-part of application Ser. No. 11/606,793, filed Nov. 29, 2006; which application is incorporated herein by reference.

TECHNICAL FIELD

The present invention relates generally to connectors for communications cable. More specifically, the present invention relates to hybrid fiber/copper connector systems and methods.

BACKGROUND

It is known to provide portable cameras and other data or image gathering devices with cable to provide power to the device and to carry data to and from the device. As these devices have increased in image or data gathering capacity, greater demand for bandwidth to carry data to and from the devices has arisen. One way of providing this increased bandwidth is to use optical fiber for carrying data to and from the devices.

However, optical fiber may not be able to provide an adequate power supply for the devices, so it is still desirable to have copper or other metallic wires extending to the devices. Hybrid cables including both copper wires and optical fiber within a single cable have been used to meet the power and data transfer needs of these devices. Since the techniques and devices for terminating and connectorizing copper and fiber cables are quite different, new connectors or methods of connecting such hybrid cables to each have been developed. These known connectors do allow interconnection of cables and devices but require that the entire connector be replaced if any one element of the cable or connector are damaged. Common hybrid cables may include two or more optical fibers and one or more pairs of copper wires. If any of these wires or optical fibers, or the termination of these wires or optical fibers are damaged, the entire connector must be replaced and all of the wires and fibers re-terminated.

Improvements to hybrid connectors are desirable.

SUMMARY

The present invention relates generally to a hybrid fiber/copper connector assembly. The present invention also relates to a hybrid fiber/copper connector assembly which permits repair of damaged fibers or copper conductors carried by a hybrid cable without requiring replacement of the entire hybrid fiber/copper connector assembly or the cable. The present invention also relates to connectors for hybrid fiber/copper cables. The present invention further relates to a method of repairing a hybrid fiber/copper cable and connector.

Another aspect of the present invention relates to a hybrid fiber/copper connector assembly provided in the form of a kit that allows conversion of a hybrid fiber/copper connector from one gender to a different gender.

Another aspect of the present invention relates to a hybrid fiber/copper connector assembly that allows the hybrid fiber/copper connectors of the assembly to be converted from being hybrid connectors to being only fiber connectors or only copper connectors.

BRIEF DESCRIPTION OF THE DRAWINGS

The accompanying drawings, which are incorporated in and constitute a part of the specification, illustrate several aspects of the present invention and together with the description, serve to explain the principles of the invention. A brief description of the drawings is as follows:

FIG. 1 is a perspective view of a hybrid fiber/copper connector assembly having features that are examples of inventive aspects in accordance with the principles of the present disclosure, the hybrid fiber/copper connector assembly shown in a fully assembled configuration;

FIG. 2 is a cross-sectional view taken along line 2-2 of FIG. 1;

FIG. 6 is a top view of the first inner housing half of FIG. 5;

FIG. 7 is a bottom view of the first inner housing half of FIG. 5;

FIG. 8 is a side view of the first inner housing half of FIG. 5;

FIG. 9 is a rear end view of the first inner housing half of FIG. 5;

FIG. 11 is a perspective view of the second inner housing half of the first hybrid fiber/copper connector of FIG. 4;

FIG. 12 is a side view of the second inner housing half of FIG. 11;

FIG. 13 is a bottom view of the second inner housing half of FIG. 11;

FIG. 14 is a rear end view of the second inner housing half of FIG. 11;

FIG. 15 is a cross-sectional view of the second inner housing half taken along line 15-15 of FIG. 14;

FIG. 62 is a perspective view of a second embodiment of a second hybrid fiber/copper connector that is configured to mate with the second embodiment of the first hybrid fiber/copper connector of FIGS. 59-61 to form an assembly similar to the hybrid fiber/copper connector assembly of FIGS. 1-3;

FIG. 63 is a side view of the second embodiment of the second hybrid fiber/copper connector of FIG. 62;

FIG. 65 is a front perspective view of a bulkhead female hybrid fiber/copper connector having features that are examples of inventive aspects in accordance with the principles of the present disclosure;

FIG. 66 is a rear perspective view of the bulkhead female hybrid fiber/copper connector of FIG. 65;

FIG. 67 is an exploded perspective view of the bulkhead female hybrid fiber/copper connector of FIG. 65;

FIG. 68 is a front view of the bulkhead female hybrid fiber/copper connector of FIG. 65;

FIG. 69 is a side view of the bulkhead female hybrid fiber/copper connector of FIG. 65;

FIG. 71 is a front perspective view of a bulkhead male hybrid fiber/copper connector having features that are examples of inventive aspects in accordance with the principles of the present disclosure;

FIG. 72 is a rear perspective view of the bulkhead male hybrid fiber/copper connector of FIG. 71;

FIG. 73 is an exploded perspective view of the bulkhead male hybrid fiber/copper connector of FIG. 71;

FIG. 74 is a rear view of the bulkhead male hybrid fiber/copper connector of FIG. 71;

FIG. 75 is a side view of the bulkhead male hybrid fiber/copper connector of FIG. 70.

DETAILED DESCRIPTION

Reference will now be made in detail to the exemplary aspects of the present invention that are illustrated in the accompanying drawings. Wherever possible, the same reference numbers will be used throughout the drawings to refer to the same or like parts.

The present disclosure relates to a hybrid fiber/copper connector assembly. Aspects of the hybrid fiber/copper connector assembly include each connector having fiber and copper connecting components to connect two hybrid fiber/copper cables.

One preferred embodiment of a connector assembly permits repair of damaged fibers or copper conductors carried by a hybrid fiber/copper cable without requiring replacement of the entire connector assembly or the cable. Aspects of the present disclosure also allow the hybrid fiber/copper connectors of the assembly to be converted from one gender to a different gender. Further aspects of the present disclosure allow the hybrid fiber/copper connectors of the assembly to be converted from being hybrid connectors to being only fiber connectors or only copper connectors.

Figure 3:
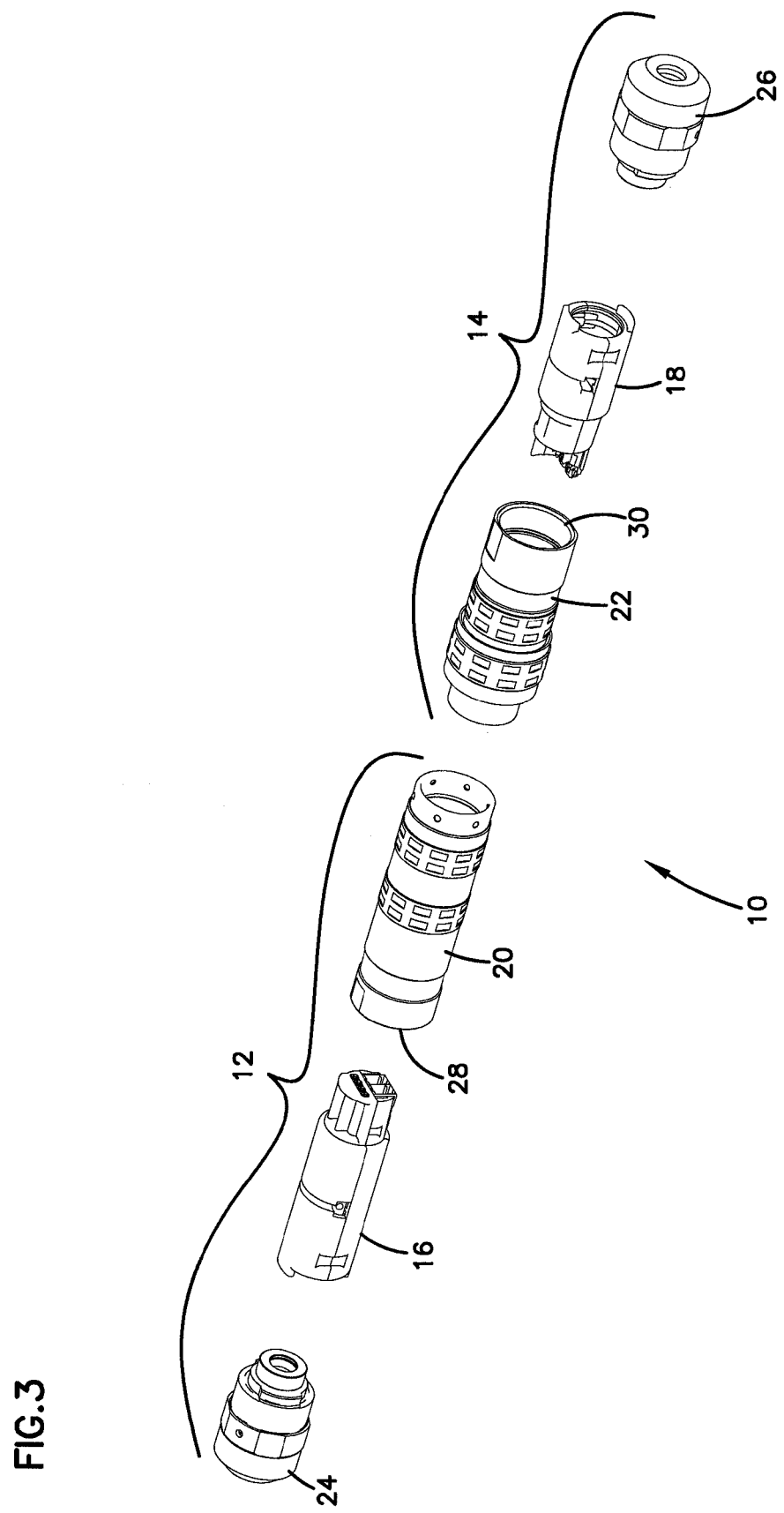
FIG. 3 is an exploded perspective view of the hybrid fiber/copper connector assembly of FIG. 1.

Referring to FIGS. 1-3, a hybrid fiber/copper connector assembly 10 having features that are examples of inventive aspects in accordance with the principles of the present disclosure is illustrated. The hybrid fiber/copper connector assembly includes a first hybrid fiber/copper connector 12 and a second hybrid fiber/copper connector 14 adapted to mate with the first hybrid fiber/copper connector 12. The first hybrid fiber/copper connector 12 may also be referred to herein as a female gender hybrid fiber/copper connector and the second hybrid fiber/copper connector 14 may be referred to herein as a male gender hybrid fiber/copper connector.

Each of the first and second hybrid fiber/copper connectors 12, 14 includes an inner connector assembly that is received within an outer housing. The inner connector assembly 16 of the first hybrid fiber/copper connector 12 is terminated to a segment of hybrid fiber/copper cable carrying both optical fibers and copper wires. Similarly, the inner connector assembly 18 of the second hybrid fiber/copper connector 14 is terminated to a segment of hybrid fiber/copper cable carrying both optical fibers and copper wires. Once terminated, inner connector assemblies 16, 18 are placed within the outer housings 20, 22 of the hybrid fiber/copper connectors 12, 14.

Before termination to the first and second hybrid fiber/copper connectors 12, 14, each cable segment is inserted through an end cap/cable clamp 24, 26, respectively, that is threadably mounted to the outer housings 20, 22. The end caps 24, 26 are configured to clamp the hybrid fiber/copper cable segments to their respective hybrid fiber/copper connectors 12, 14 and provide a weather tight seal at the cable receiving ends 28, 30, respectively, of the first and second hybrid fiber/copper connectors 12, 14. Once the end caps 24, 26 have been threaded and the hybrid cable segments connected to the respective hybrid connectors 12, 14, the first and the second hybrid fiber/copper connectors 12, 14 can, then, be mated to each other to establish both optical and electrical connection between the two hybrid cable segments. The outer housings 20, 22 of the two connectors 12, 14 cooperate to form a secure and generally weather-tight cover about the connections of the fiber strands and copper conductors within the two connectors 12, 14.

A hybrid fiber/copper cable might be used in broadcast communications. For example, such a cable might be used to connect a camera to a production facility, such as at a sporting event or other entertainment venue. Certain known prior art assemblies for connecting segments of broadcast cable might require the use of a new assembly in case of failure of any single component within the assembly. Alternatively, the failure of any of the contacts within either connector of a known assembly might necessitate the retermination of one of the cable segments.

As will be described in further detail below, the hybrid fiber/copper connector assembly 10 of the present disclosure is configured to permit repair or replacement of damaged components of the assembly. Reference herein will also be made to certain examples of hybrid fiber/copper connector assemblies that facilitate repair or replacement of damaged components of the assembly without requiring the use of a new assembly that are disclosed in U.S. Patent Application Publication Nos. US 2006/0056769 A1 and US 2006/0233496 A1, the entire disclosures of which are incorporated herein by reference.

U.S. Patent Application Publication Nos. US 2006/0056769 A1 and US 2006/0233496 A1 illustrate a schematic cross-section of a hybrid fiber/copper communications cable that may be suitable for use with the hybrid fiber/copper connector assembly 10 of the present disclosure. The hybrid cable, illustrated in FIG. 4 of US 2006/0056769 A1 and US 2006/0233496 A1, includes a pair of jacketed optical fibers and four jacketed copper wires, extending adjacent a linearly extending strength member. This is one example configuration of a hybrid cable that might be suitable for use with the hybrid connector assembly 10 of the present disclosure. Other configurations of hybrid cables are also known, with more or fewer optical fibers and/or copper wires, which may also be used with the hybrid fiber/copper connector assembly 10 of the present disclosure.

When used in the broadcast camera environment described above, one of the optical fibers may be used to transmit video and related audio signals to the camera and the second optical fiber may be used to transmit video and audio captured by the camera to the production facility or some other location. One pair of copper conductors may be used to provide power to operate the camera, while the other pair of copper conductors may be used to provide communications between the production facility and the camera operator. The number of fiber strands and copper conductors extending within the hybrid cable may be varied as required to support the desired usage and communication bandwidth of the camera.

According to another aspect of the disclosure, the hybrid fiber/copper connector assembly 10 of the present disclosure is configured to allow the first and second hybrid fiber/copper connectors 12, 14 of the assembly 10 to be converted from one gender to a different gender. As such, if an existing segment of a hybrid fiber/copper cable segment is terminated, for example, to a first hybrid fiber/copper connector 12 (i.e., a female gender connector) and an available second segment of a hybrid cable is also terminated to a first hybrid fiber/copper connector 12 (i.e., a female gender connector), the first hybrid fiber/copper connector 12 may be disassembled and converted into a second hybrid fiber/copper connector 14 (i.e., a male gender connector), without retermination of the cable segment. The converted male gender hybrid fiber/copper connector 14 can, then, be mated to the female gender hybrid fiber/copper connector 12.

Furthermore, according to another aspect of the disclosure, the modular configuration of the hybrid fiber/copper connector assembly 10 of the present disclosure allows both the first and the second hybrid fiber/copper connectors 12, 14 of the assembly 10 to be converted from being hybrid connectors to being fiber-only connectors (e.g., quad fiber connectors) or copper-only connectors (e.g., having eight copper conductors).

Figure 4:
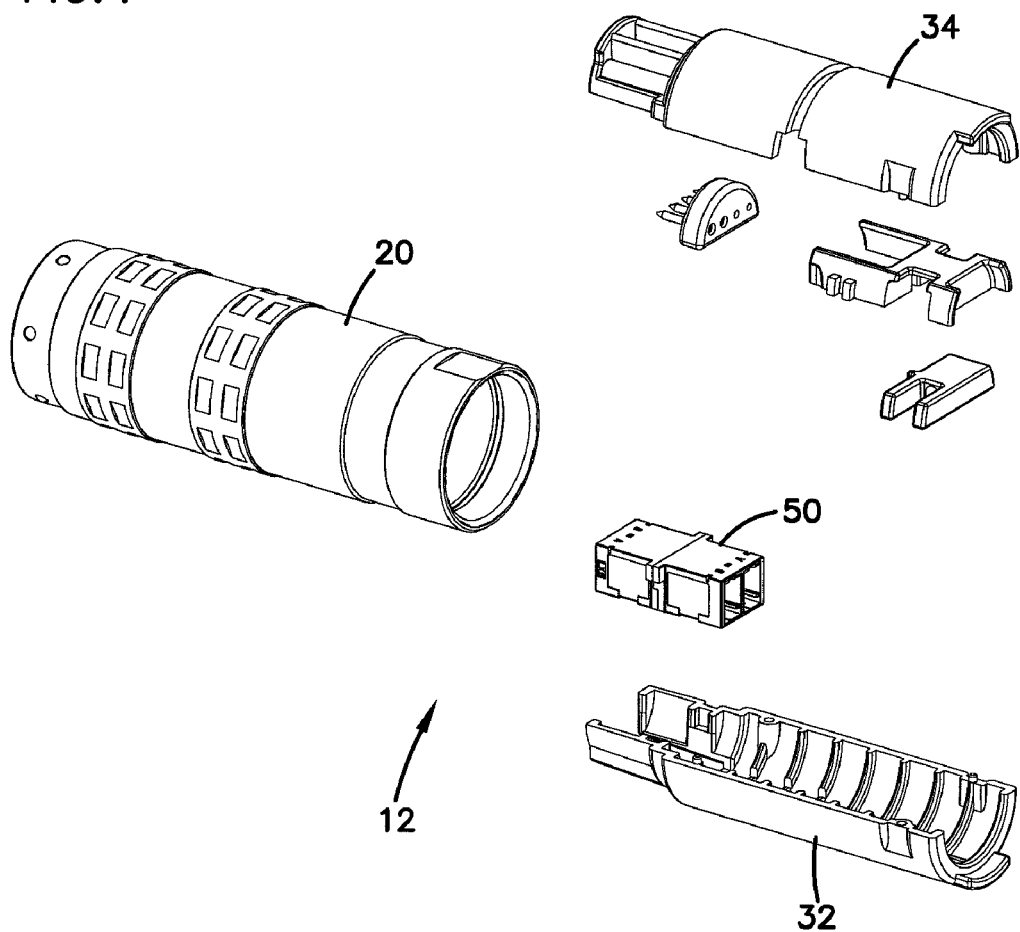
FIG. 4 is an exploded perspective view of the first hybrid fiber/copper connector of the hybrid fiber/copper connector assembly of FIGS. 1-3.
Figure 5:
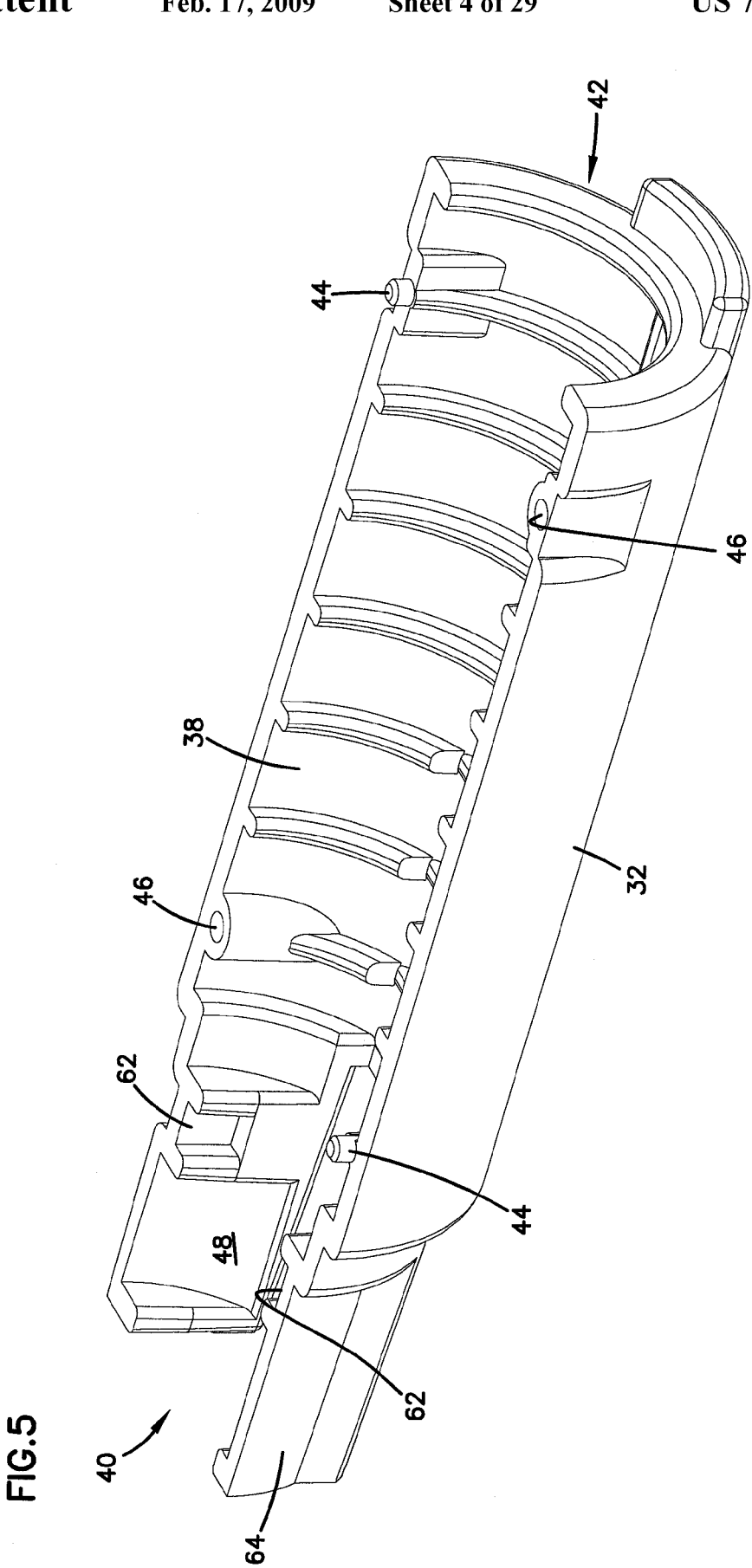
FIG. 5 is a perspective view of the first inner housing half of the first hybrid fiber/copper connector of FIG. 4.

Referring now to FIG. 4, an exploded view of the first, female gender, hybrid fiber/copper connector 12 is illustrated. The first hybrid fiber/copper connector 12 includes a first inner housing half 32 and a second inner housing half 34. The first and the second inner housing halves 32, 34 detachably mate together to form an inner connector assembly 16 of the first hybrid fiber/copper connector 12. Once the first and the second inner housing halves 32, 34 are terminated to a hybrid cable and joined together, they are inserted into an outer housing 20 of the first hybrid fiber/copper connector 12. As shown in FIGS. 1 and 2, and as discussed above, before the hybrid cable segments are terminated to the inner connector assemblies 16, 18 of the first and second hybrid fiber/copper connectors 12, 14, the hybrid cable segments are inserted through end caps 24, 26. The end caps 24, 26 are, then, threaded onto the outer housings 20, 22 to clamp the hybrid cables and to seal it against the outer housings 20, 22.

Referring back to FIG. 4, the first inner housing half 32 is configured to hold the fiber components of the connector 12 while the second inner housing half 34 is configured to hold the electrical/copper components of the connector 12.

Now referring to FIGS. 5-9, the first inner housing half 32 of the first hybrid fiber/copper connector 12 is illustrated. The first inner housing half 32 includes an elongated body 36 defining an interior 38. The body 36 includes a mating end 40 and a cable receiving end 42. The first inner housing half 32 defines a pair of alignment pins 44 and a pair of pin openings 46 for cooperatively mating with the second inner housing half 34 (see second inner housing half 34 in FIGS. 11-15). Adjacent the mating end 40 of the first inner housing half 32 is a pocket 48 configured to carry a fiber optic adapter 50.

Figure 10:
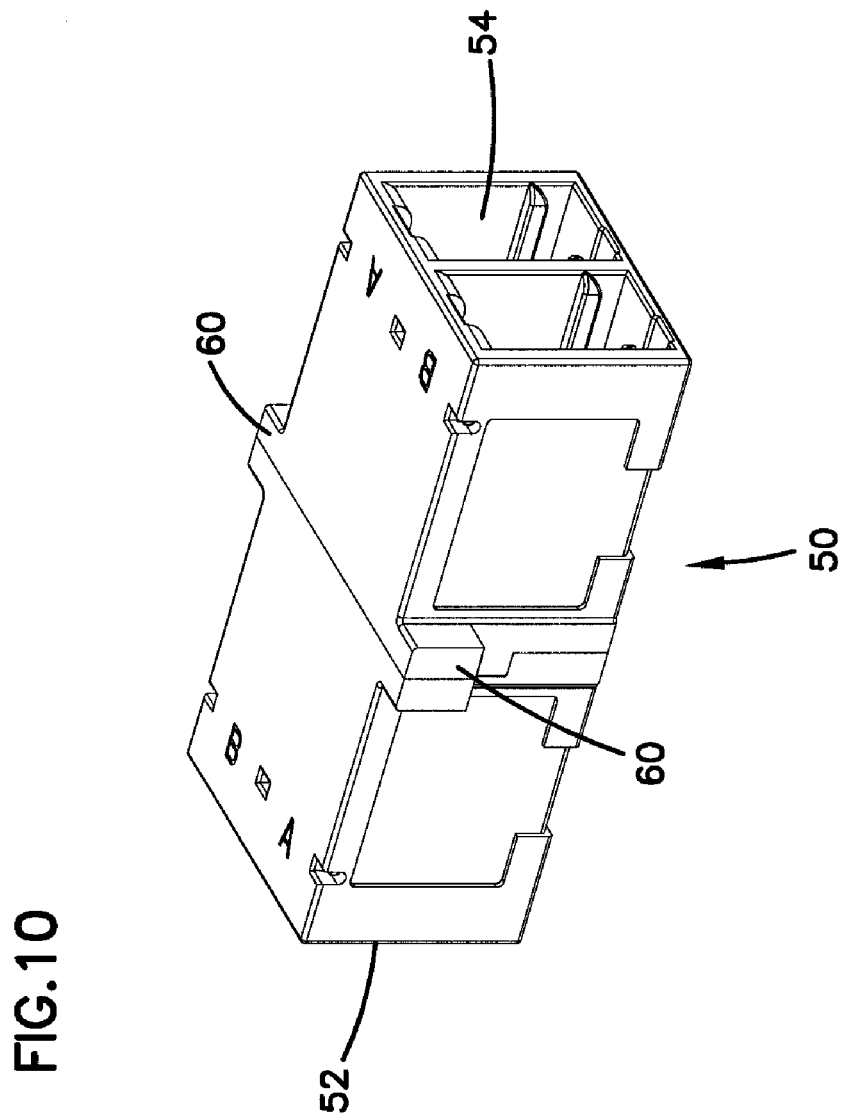
FIG. 10 is a perspective view of the fiber optic adapter of the first hybrid fiber/copper connector of FIG. 4, the fiber optic adapter configured to be placed within the first inner housing half of FIG. 5.
Figure 28:
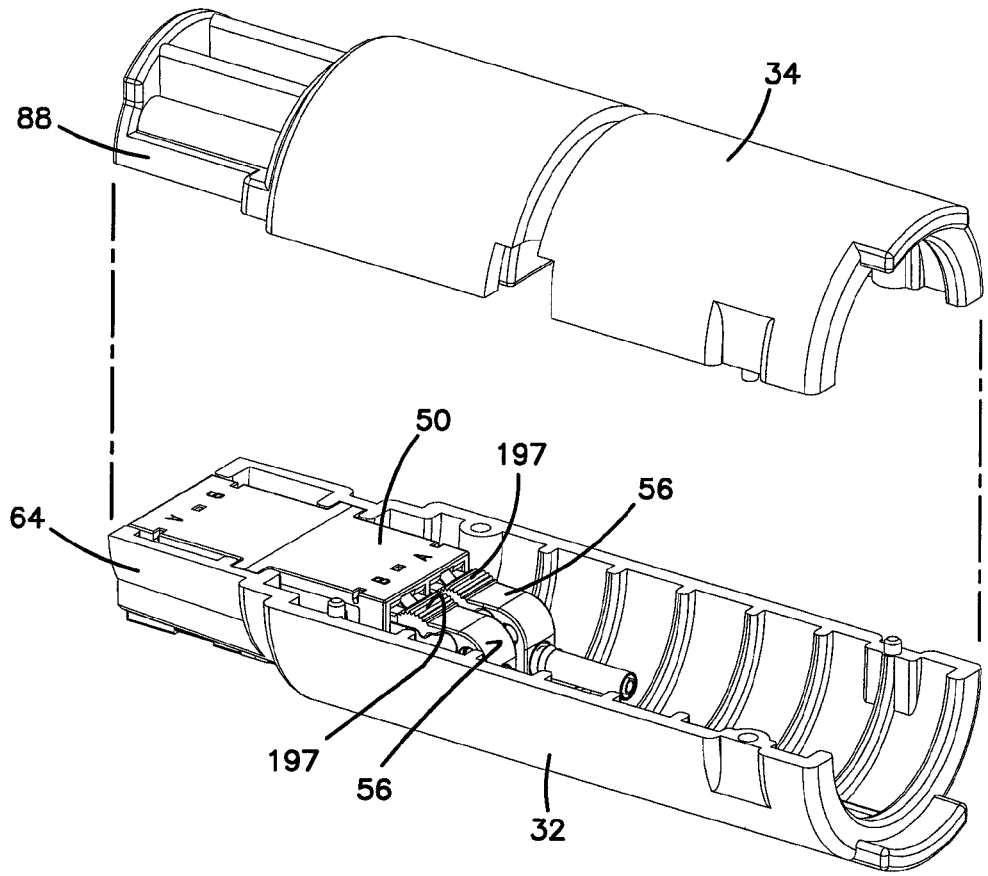
FIG. 28 illustrates a top perspective view of the first inner housing half and the second inner housing half of the first hybrid fiber/copper connector of FIG. 4 in a partially assembled configuration, the first inner housing half and the second inner housing half configured to be removably mounted together to form an inner connector assembly of the first hybrid fiber/copper connector of FIG. 4.

An adapter 50 configured to be placed within the first inner housing 32 is shown in FIG. 10. As depicted, the fiber optic adapter 50 is a duplex adapter including a front end 52 and a rear end 54. Two fiber optic connectors mounted into the front end 52 of the fiber optic adapter 50 optically mate with two fiber optic connectors mounted into the rear end 54 of the fiber optic adapter 50. As shown in FIG. 28, the fiber optic connectors 56 that are received within the fiber optic adapter 50 are LX.5 format connectors. As depicted, the adapter 50 is configured to receive and optically connect two pairs of LX.5 connectors 56. LX.5 connectors and mating adapters are available from ADC Telecommunications, Inc. Other connector and adapter formats can also be used.

Figure 31:
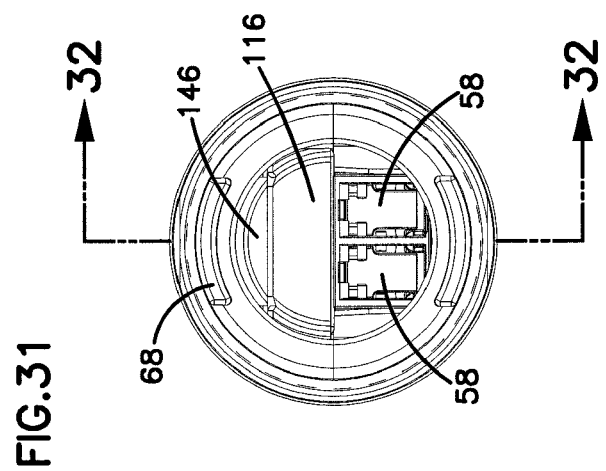
FIG. 31 illustrates a rear end view of the first hybrid fiber/copper connector of FIG. 4, the first hybrid fiber/copper connector shown in a fully assembled configuration.

As shown in the end view in FIG. 31, the fiber optic adapter 50 includes shutters 58 adjacent the front and rear ends 52, 54 that pivot between an open position and a closed position. The shutters 58 are sized such that in the closed position, the shutters 58 block direct visual inspection through an open front end 52 or an open rear end 54. As a result, in an event a fiber optic connector 56 is connected to one end of the fiber optic adapter 50, the closed shutter 58 on the opposite end prevents a technician from looking directly at light on the opposite end of the fiber optic adapter 50. Further details of the fiber optic adapter 50 and the fiber optic connectors 56 that are configured to be inserted into the adapter 50 are described in U.S. Pat. Nos. 5,883,995 and 6,142,676, the entire disclosures of which are incorporated herein by reference.

The fiber optic adapter 50 includes a pair of flanges 60 on the sides of the adapter 50. The flanges 60 are received within recesses 62 defined in the first inner housing half 32.

Referring back to FIGS. 5-9, the mating end 40 of the body 36 of the first inner housing half 32, includes an exterior recessed portion 64 defined on a first side 66 of the body 36. The recessed portion 64 is configured to act as a keying feature when the second hybrid fiber/copper connector 14 is mated to the first hybrid fiber/copper connector 12, as will be discussed in further detail below. In this manner, the correct orientation of the mating ends of the first and second connectors 12, 14 are obtained when the two hybrid connectors 12, 14 are mated.

FIGS. 11-15 illustrate the second inner housing half 34 of the first, female gender, hybrid fiber/copper connector 12. The second inner housing half 34 is configured to house the copper components of the first hybrid fiber/copper connector 12. As shown, the second inner housing half 34 includes an elongated body 68 defining an interior 70. The body 68 includes a mating end 72 and a cable receiving end 74.

The second inner housing half 34 includes a pair of alignment pins 76 and a pair of pin openings 78 for cooperatively mating with the corresponding pins 44 and openings 46 of the first inner housing half 32.

The second inner housing half 34 includes an integrally formed conductor pin support 80 adjacent the mating end 72. The conductor pin support 80 defines four channels 82. The channels 82 include therein four conductive pins 84. The conductive pins 84 are shown in the cross-sectional view in FIG. 15 which is taken along line 15-15 of FIG. 14. As depicted, each of the four conductive pins 84 includes two female ends 86. The conductive pins 84 are generally permanently mounted within the pin support 80 and form a part of the second inner housing half 34.

As in the first inner housing half 32, the second inner housing half 34 defines an exterior recessed portion 88 on a first side 90 of the pin support 80. The recess 88 is configured align with the recess 64 of the first inner housing half 32 when the two housing halves 32, 34 are joined to define a big recess. The big recess acts as a keying feature when the first hybrid fiber/copper connector 12 is mated to the second hybrid fiber/copper connector 14 such that the correct orientation of the mating ends of the first and second connectors 12, 14 are obtained.

The body 68 of the second inner housing half 34 includes an exterior circumferential groove 92. The body 68 also defines opposing slots 94 positioned at each end of the circumferential groove 92. The circumferential groove 92 and the slots 94 accommodate a strength member that might be a part of a hybrid cable.

Figure 16:
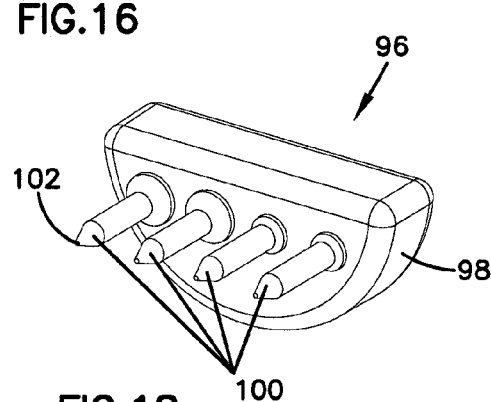
FIG. 16 is a perspective view of the conductor mount of the first hybrid fiber/copper connector of FIG. 4, the conductor mount configured to be placed within the second inner housing half of FIG. 11.
Figure 17:
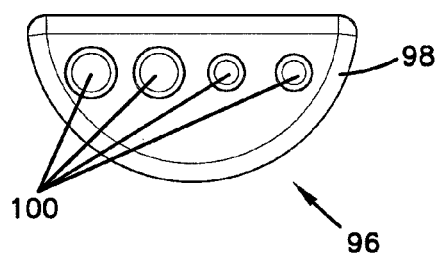
FIG. 17 is a front view of the conductor mount of FIG. 16.
Figure 18:
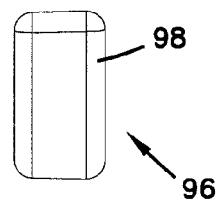
FIG. 18 is a side view of the conductor mount of FIG. 16 shown with the electrical conductors removed.
Figure 19:
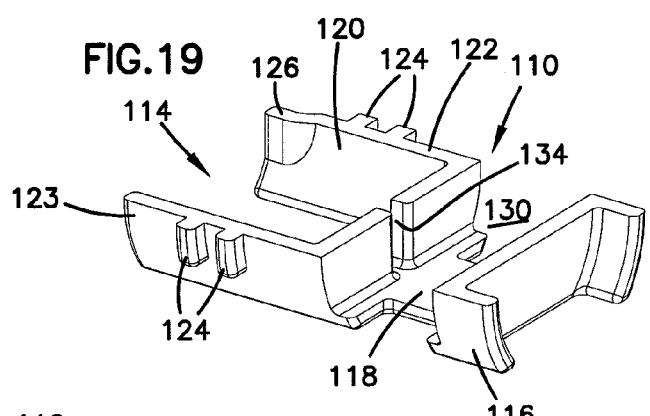
FIG. 19 is a perspective view of the conductor mount retainer of the first hybrid fiber/copper connector of FIG. 4, the conductor mount retainer configured to be placed within the second inner housing half of FIG. 11.
Figure 20:
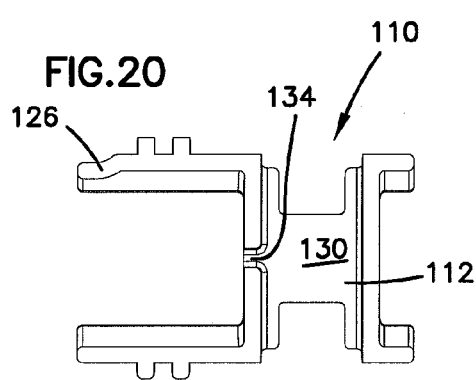
FIG. 20 is a top view of the conductor mount retainer of FIG. 19.
Figure 21:
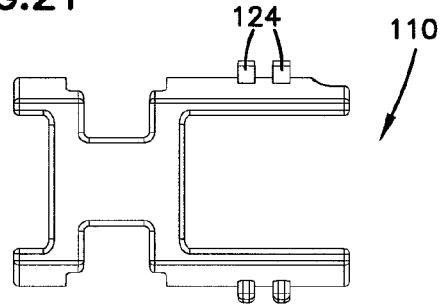
FIG. 21 is a bottom view of the conductor mount retainer of FIG. 19.
Figure 22:
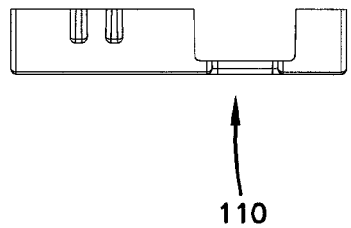
FIG. 22 is a side view of the conductor mount retainer of FIG. 19.
Figure 23:
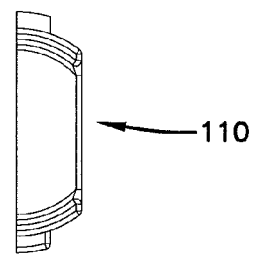
FIG. 23 is a rear end view of the conductor mount retainer of FIG. 19.
Figure 24:
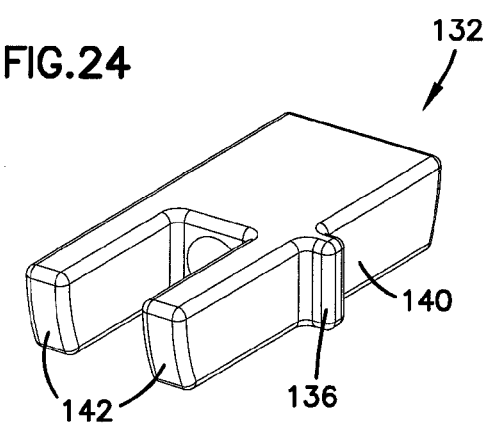
FIG. 24 is a perspective view of the strength member clamp of the first hybrid fiber/copper connector of FIG. 4, the strength member clamp configured to be placed within the second inner housing half of FIG. 11.
Figure 25:
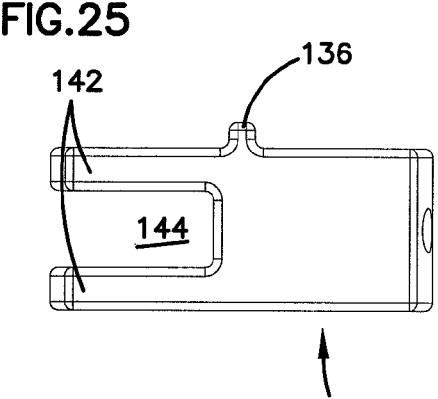
FIG. 25 is a top view of the strength member clamp of FIG. 24.
Figure 26:
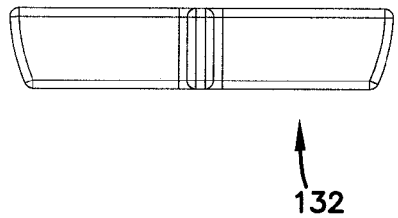
FIG. 26 is a front end view of the strength member clamp of FIG. 24.
Figure 27:
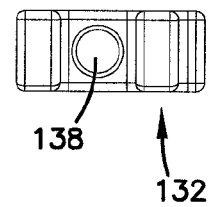
FIG. 27 is a side view of the strength member clamp of FIG. 24.
Figure 29:
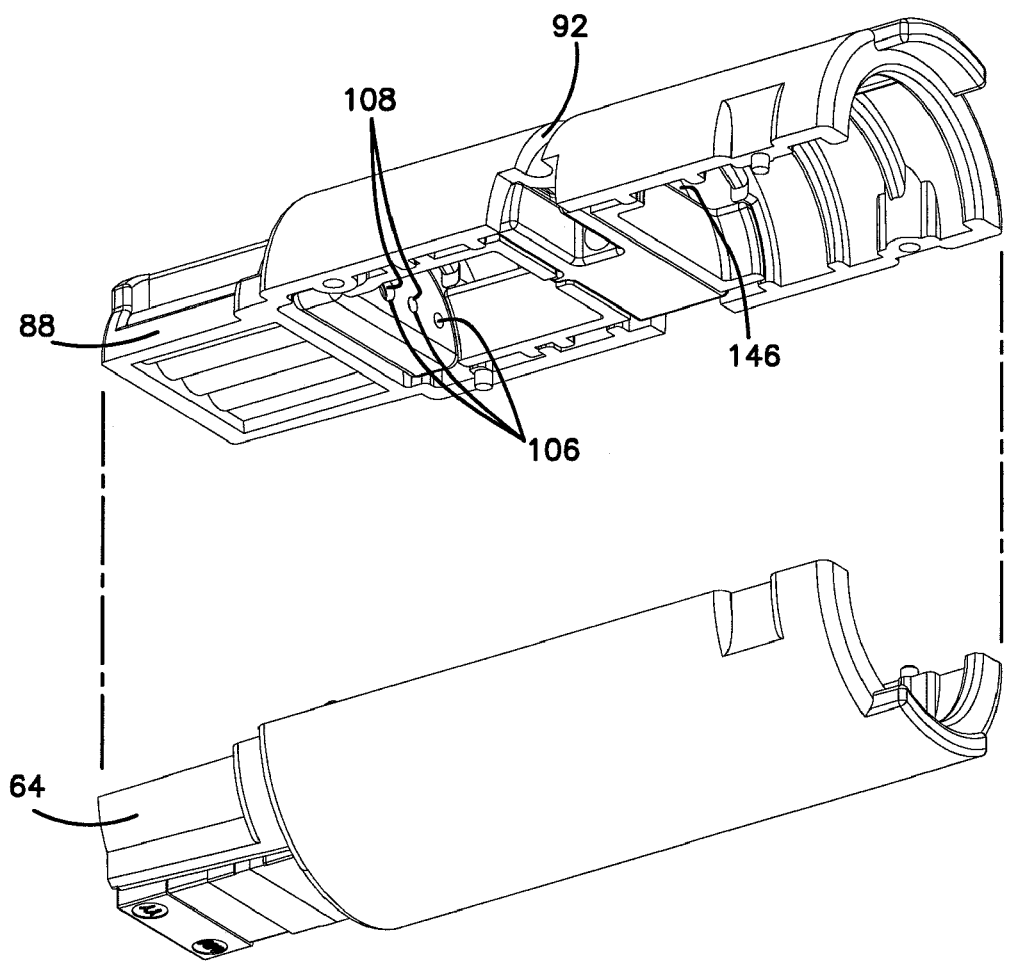
FIG. 29 illustrates a bottom perspective view of the first inner housing half and the second inner housing half of the first hybrid fiber/copper connector of FIG. 4 in a partially assembled configuration.

The interior 70 of the second inner housing half 34 is configured to receive a conductor mount 96. The conductor mount 96 is shown in FIGS. 16-18. The conductor mount 96 includes a generally hemispherical body 98 configured to match the curved shape of the interior 70 of the second inner housing half 34. The conductor mount 96, as depicted, includes four forwardly protruding conductive pins 100. The forward ends 102 of the conductive pins 100 are adapted to be inserted within the channels 82 defined by the pin support 80 at the mating end 72 of the second inner housing half 34. As shown in FIG. 29, the conductor mount 96 is removably inserted into a recess 104 in the interior 70 of the body 68 and slid forwardly toward the pin support 80. The conductor mount 96 is slid until the conductive pins 100 physically and electrically mate with the rear female ends 86 of the conductive pins 84 in the channels 82 of the pin support 80.

The rear ends 106 of the conductive pins 100 are exposed through openings 108 defined on the conductor mount 96. The rear ends 106 of the conductive pins 100 are terminated to copper wires of a hybrid fiber/copper cable. Since the conductor mount 96 is a removable piece, the conductor mount 96 can be removed from the second inner housing half 34 of the first hybrid fiber/copper connector 12 (i.e., female gender connector) and reinserted into the second inner housing of the second hybrid fiber/copper connector 14 (i.e., male gender connector) as part of the conversion of the genders of the hybrid connectors 12, 14.

The conductor mount 96 is retained within the second inner housing half 34 by a conductor mount retainer 110 shown in FIGS. 19-23. As shown, the conductor mount retainer 110 includes an elongated body 112 with a front portion 114, a rear portion 116 and a middle portion 118. The front portion 114 defines a U-shaped body 120 with a pair of forwardly extending legs 122, 123. Each leg 122, 123 defines a pair of flanges 124 on the sides of the legs 122, 123. When the conductor mount retainer 110 is placed into the second inner housing half 34, a rib 126 defined in the interior 70 of the second inner housing half 34 is received between the flanges 124. The rib 126 and the flanges 124 help hold the conductor mount retainer 110 within the second inner housing half 34 with a friction fit.

The first leg 122 also defines a curved portion 126. The curved portion 126 accommodates an alignment pin opening 78 defined in the second inner housing half 34 when the conductor mount retainer 110 is slidably inserted into the body 68 of the second inner housing half 34.

The middle portion 118 of the conductor mount retainer 110 includes a recess 130 for receiving a strength member clamp 132. The strength member clamp 132 is illustrated in FIGS. 24-27. The middle portion 118 of the conductor mount retainer 110 defines a slot 134 for receiving a tab 136 of the strength member clamp 132 for properly orientating the clamp 132. The strength member clamp 132 defines a throughhole 138 extending laterally through its body 140. The strength member clamp 132 defines a pair of laterally extending arms 142 that define a pocket 144 thereinbetween. The strength member clamp 132 is shown inserted into the recess 130 of the middle portion 118 of the conductor mount retainer 110 in FIG. 29.

Referring back to FIGS. 24-27, a strength member of a cable is to be received from the cable receiving end 28 of the first hybrid fiber/copper connector 12. The strength member is inserted through an opening 146 created between the body 68 of the second inner housing half 34 and the rear portion 116 of the conductor mount retainer 110. The strength member is, then, to be guided downwardly between the arms 142 of the strength member clamp 132 and then upwardly and around the circumferential groove 92. Once the strength member has been wrapped around the circumferential groove 92, it is received into the throughhole 138 of the strength member clamp 132 at the opposite side of the arms 142. The strength member, then, comes out of the throughhole 138 between the arms 142 and is crimped at this location. The crimped end of the strength member is held in the pocket 144 defined between the arms 142. According to one embodiment, the strength member clamp 132 depicted herein is rated to hold 100 lbs. of force.

Figure 33:
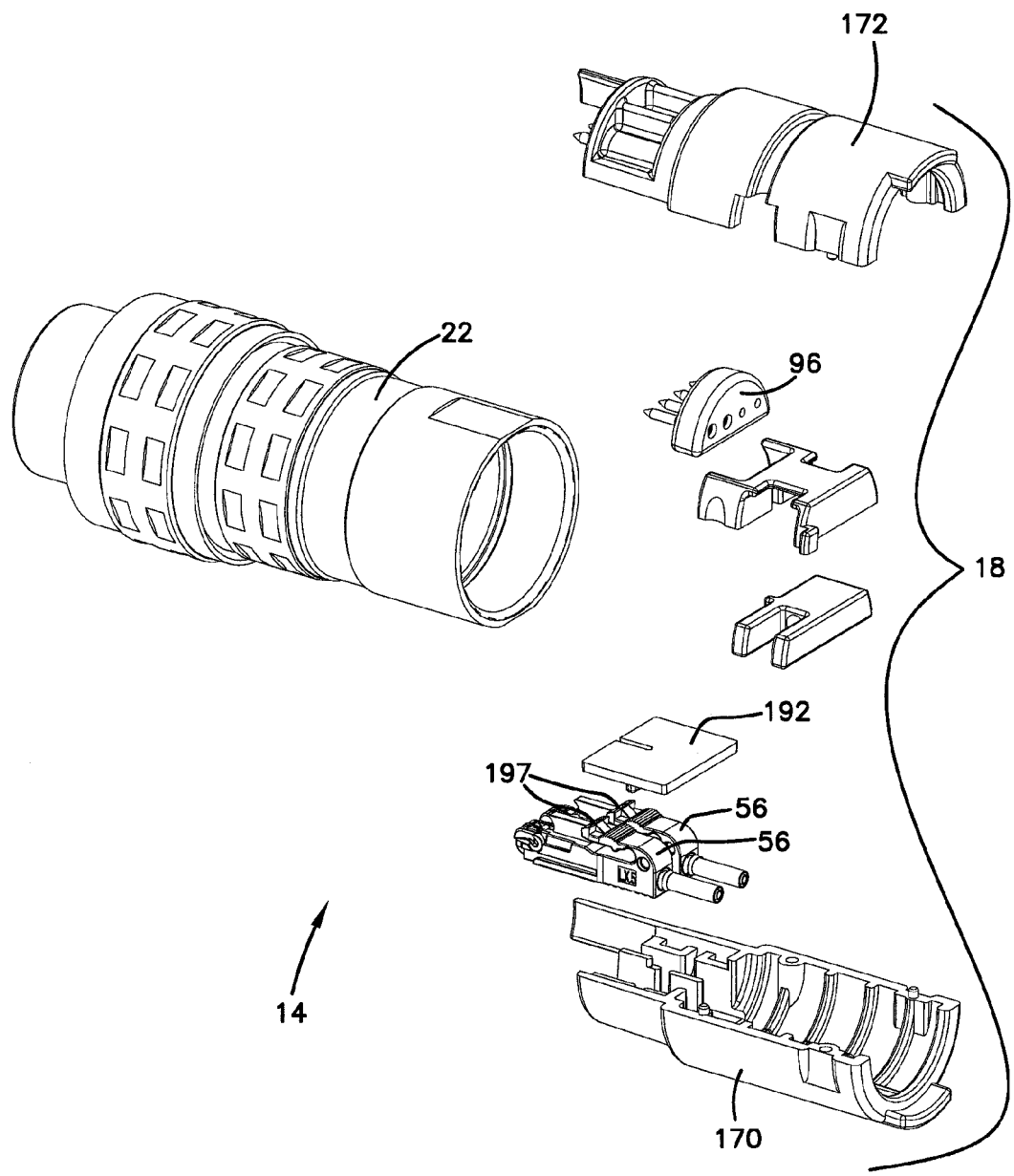
FIG. 33 is an exploded perspective view of the second hybrid fiber/copper connector of the hybrid fiber/copper connector assembly of FIGS. 1-3.
Figure 34:
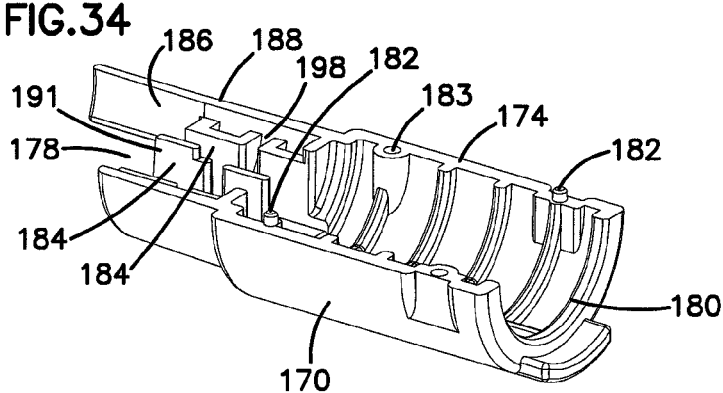
FIG. 34 is a perspective view of the first inner housing half of the second hybrid fiber/copper connector of FIG. 33.
Figure 35:
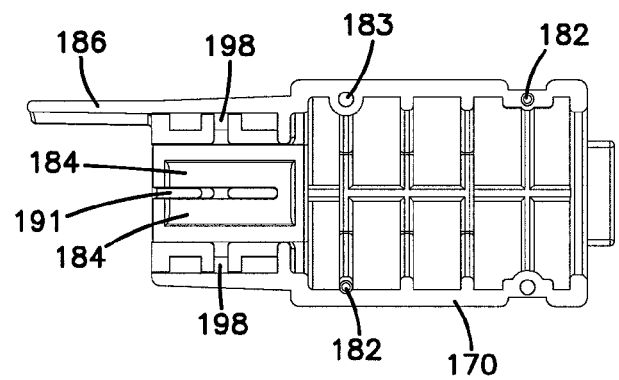
FIG. 35 is a top view of the first inner housing half of FIG. 34.
Figure 36:
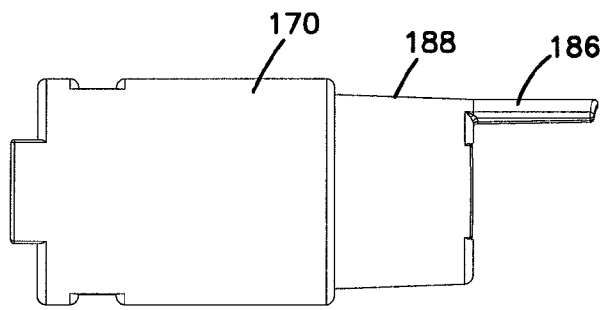
FIG. 36 is a bottom view of the first inner housing half of FIG. 34.
Figure 37:
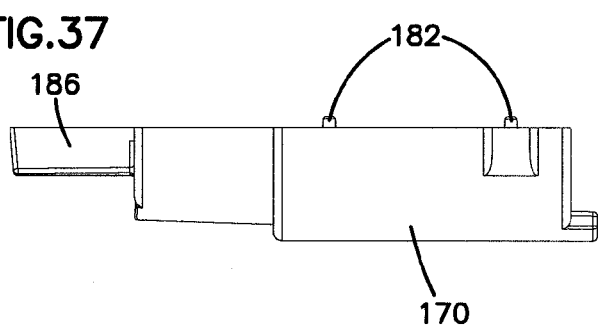
FIG. 37 is a side view of the first inner housing half of FIG. 34.
Figure 38:
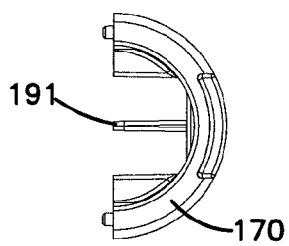
FIG. 38 is a rear end view of the first inner housing half of FIG. 34.
Figure 39:
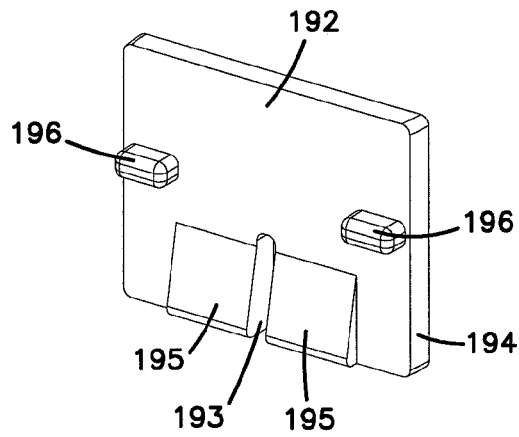
FIG. 39 is a perspective view of the fiber optic connector retainer of the second hybrid fiber/copper connector of FIG. 33, the fiber optic connector retainer configured to be placed within the first inner housing half of FIG. 34.
Figure 40:
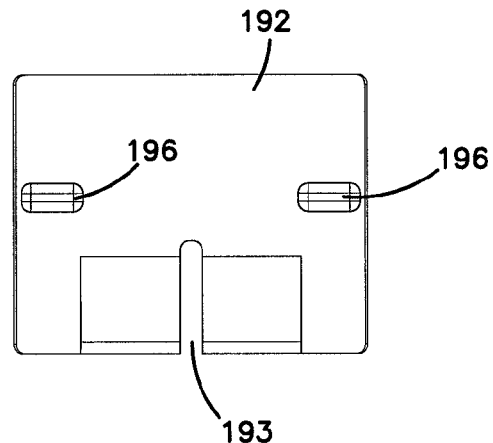
FIG. 40 is a bottom view of the fiber optic connector retainer of FIG. 39.
Figure 41:
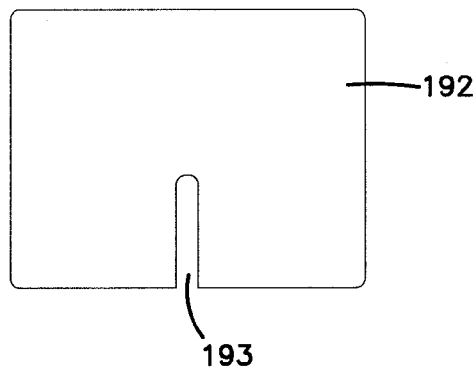
FIG. 41 is a top view of the fiber optic connector retainer of FIG. 39.
Figure 42:
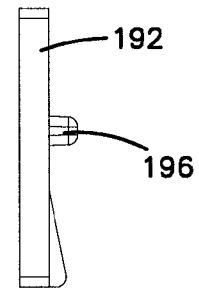
FIG. 42 is a side view of the fiber optic connector retainer of FIG. 39.
Figure 43:
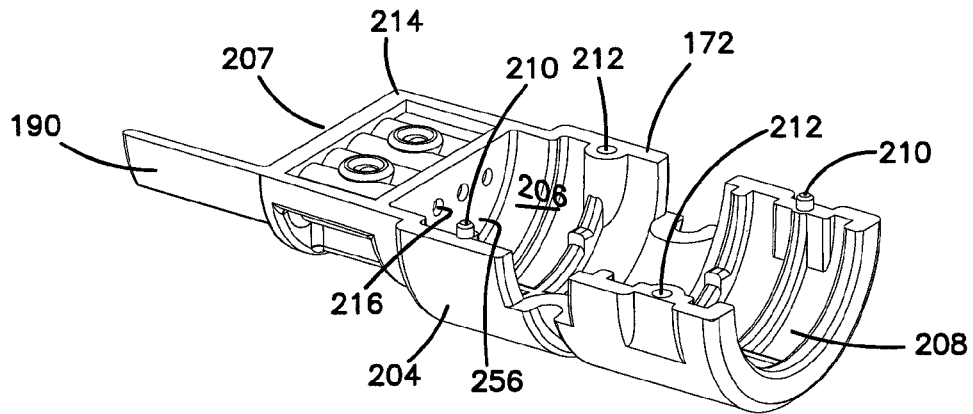
FIG. 43 is a perspective view of the second inner housing half of the second hybrid fiber/copper connector of FIG. 33.
Figure 44:
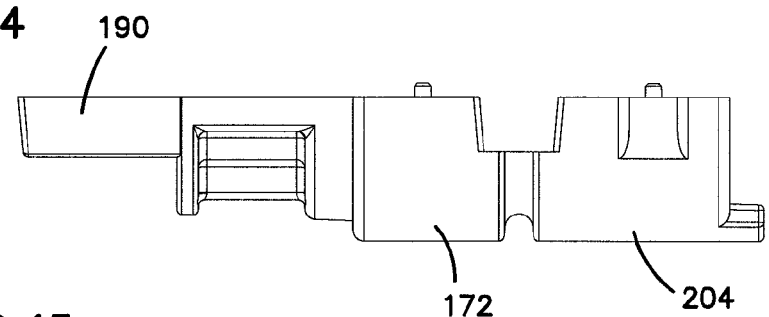
FIG. 44 is a side view of the second inner housing half of FIG. 43.
Figure 45:
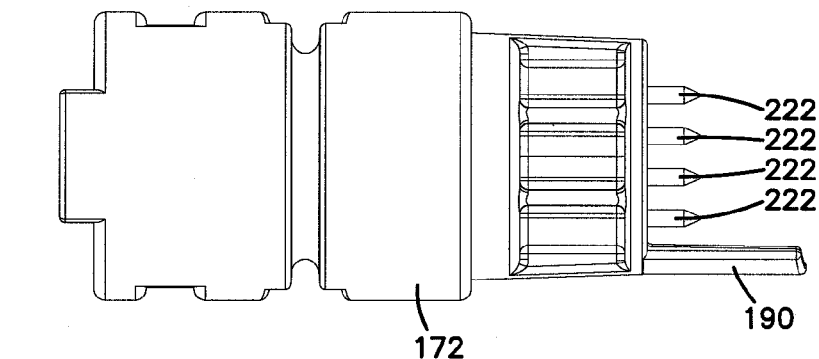
FIG. 45 is a bottom view of the second inner housing half of FIG. 43.
Figure 47:
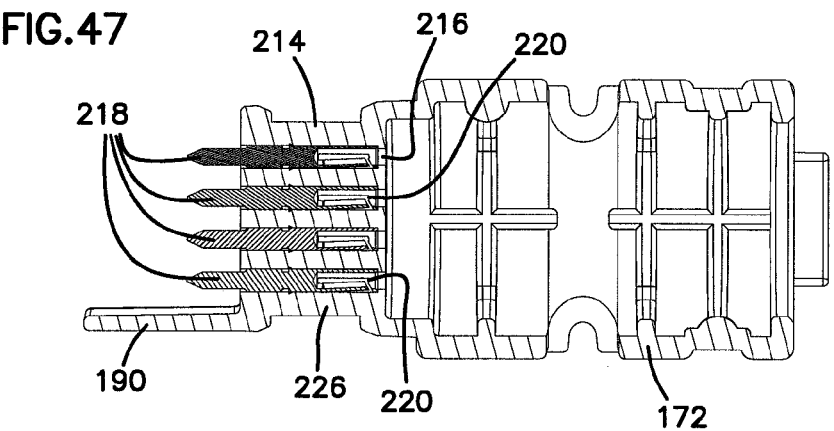
FIG. 47 is a cross-sectional view of the second inner housing half taken along line 47-47 of FIG. 46.
Figure 46:
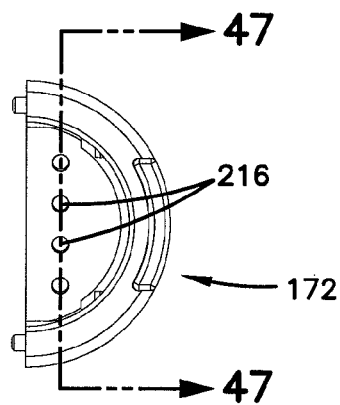
FIG. 46 is a rear end view of the second inner housing half of FIG. 43.
Figure 48:
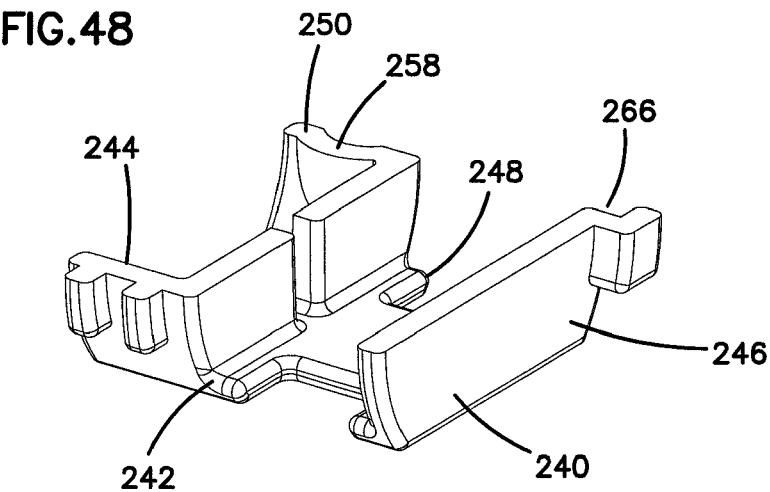
FIG. 48 is a perspective view of the conductor mount retainer of the second hybrid fiber/copper connector of FIG. 33, the conductor mount retainer configured to be placed within the second inner housing half of FIG. 43.

In FIGS. 28-29, the first and second inner housing halves 32, 34 are shown with the interior components inserted into the housing halves 32, 34. As shown, the fiber optic adapter 50 in the first inner housing half 32 receives a pair of fiber optic connectors 56 which may be terminated to the optical fibers of a hybrid fiber/copper cable. The interior 38 of the body 36 of the first inner housing half 32 may accommodate optical slack storage. During a gender conversion, these fiber optic connectors 56, just like the conductor mount 96 of the second inner housing half 34, may be removed from the fiber optic adapter 50 and from the first inner housing half 32 and remounted within a first housing half of the second hybrid fiber/copper connector 14 (i.e., male gender connector), to convert the gender of the hybrid fiber/copper connector. Such a male gender connector 14 having two male inner housing halves are shown in FIG. 33. The fiber optic connectors 56 and the fiber optic adapters 50 depicted in the present disclosure are described in further detail in U.S. Pat. No. 5,883,995, the entire disclosure of which has been incorporated herein by reference.

Figure 30:
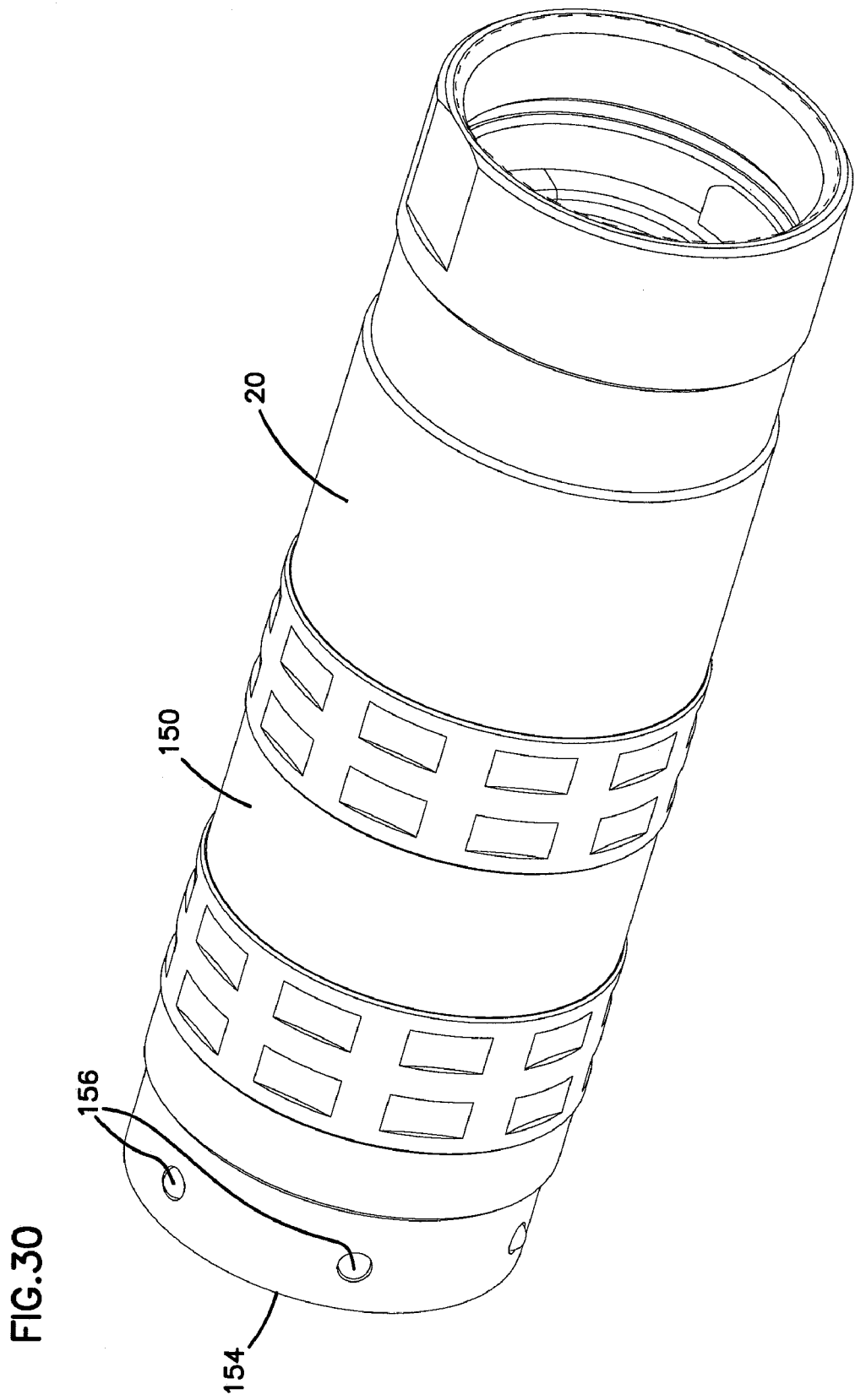
FIG. 30 illustrates an outer housing of the first hybrid fiber/copper connector of FIG. 4, the outer housing configured to receive the first and second inner housing halves of FIGS. 28-29.
Figure 32:
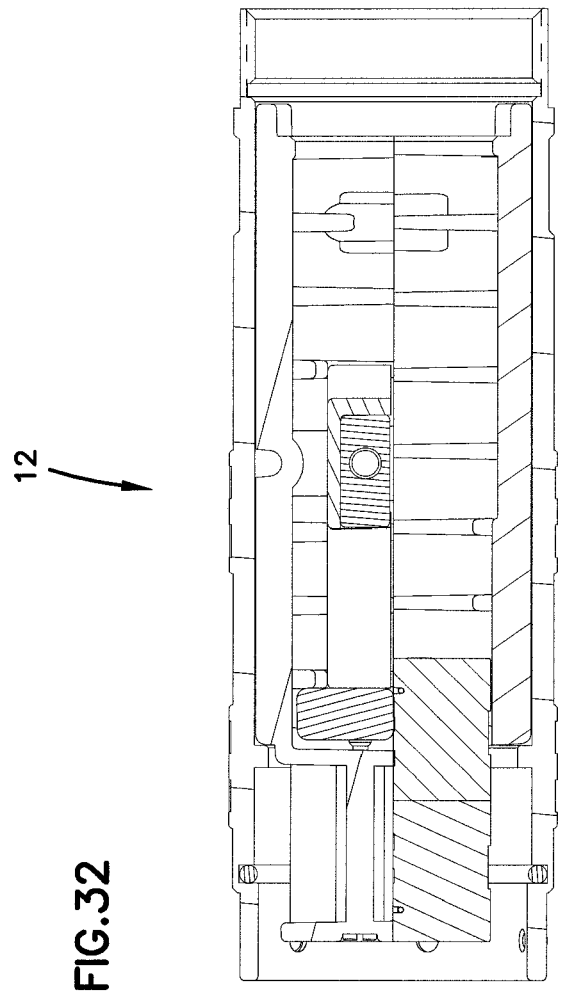
FIG. 32 is a cross-sectional view taken along line 32-32 of FIG. 31.

FIG. 30 illustrates the outer housing 20 of the first hybrid fiber/copper connector 12. As discussed before, once the first and the second housing halves 32, 34 are joined, the inner connector assembly 16 is slidable inserted into the outer housing 20 from a cable receiving end 28. FIGS. 31-32 show the first and second inner housing halves 32, 34 of the first hybrid fiber/copper connector 12 placed into the outer housing 20 of the first hybrid fiber/copper connector 12.

The outer circumferential wall 150 of the outer housing 20 includes gripping features 152. The mating end 154 of the outer housing 20 includes a plurality of circumferentially arranged ball bearings 156. The ball bearings 156 at the mating end 154 are configured to engage a circumferential recess 158 defined on an intermediate circumferential wall 160 of the outer housing 22 of the second hybrid fiber/copper connector 14. When the outer housings 20, 22 of the two hybrid connectors 12, 14 are coupled, a sliding ring 162 of the outer housing 22 of the second hybrid fiber/copper connector 14 is slid over the mating end 154 and the ball bearings 156 of the outer housing 20 of the first hybrid connector 12 to hold the two hybrid fiber/copper connectors 12, 14 in a mated configuration. The sliding locking ring 162 of the outer housing 22 of the second hybrid fiber/copper connector 14 and the recess 158 for receiving the ball bearings 156 is illustrated in FIGS. 1-3 and 54. In FIGS. 1 and 2, the sliding ring 162 is shown as having been slid over the ball bearings 156 of the outer housing 20 of the first hybrid fiber/copper connector 12. The sliding ring 162 is spring biased toward a locking position to hold the ball bearings 156 against the recess 158 on the intermediate circumferential wall 160 of the outer housing 22 of the second hybrid fiber/copper connector 14.

As discussed previously, before a hybrid cable segment is to be terminated to the inner connector assembly 16 of the first hybrid fiber/copper connector 12, the hybrid cable segment is inserted through an end cap cable clamp 24. The end cap 24 is threadingly mated to the cable receiving end 28 of the outer housing 20 of the first hybrid fiber/copper connector 12. As the end cap 24 is threaded, a collet 164 within the end cap 24 is compressed by a tapered rear seal member 166. Please refer to FIG. 2 for a cross-sectional view of the end cap 24 and the collet 164. As the collet 164 is compressed radially inwardly, it seals the cable jacket to the outer housing 20 of the first hybrid fiber/copper connector 12. A similar cable clamp and operation thereof is described in further detail in U.S. Pat. Nos. 6,575,786 and 6,846,988, the entire disclosures of which have been incorporated herein by reference.

Referring now to FIG. 33, an exploded view of the second, male gender, hybrid fiber/copper connector 14 is illustrated. The second hybrid fiber/copper connector 14 includes a first inner housing half 170 and a second inner housing half 172. The first and the second inner housing halves 170, 172 detachably mate together to form the inner connector assembly 18 of the second hybrid fiber/copper connector 14. Once the first and the second inner housing halves 170, 172 are mated and terminated to a hybrid cable, they are inserted into an outer housing 22 of the second hybrid fiber/copper connector 14.

As in the first hybrid fiber/copper connector 12, the first inner housing half 170 is configured to hold the fiber components of the connector 14 while the second inner housing half 172 is configured to hold the electrical/copper components of the connector 14.

Now referring to FIGS. 34-38, the first inner housing half 170 of the male hybrid fiber/copper connector 14 is illustrated. The first inner housing half 170 includes an elongated body 174 defining an interior 176 including a mating end 178 and a cable receiving end 180. The first inner housing half 170 defines a pair of alignment pins 182 and a pair of pin openings 183 for cooperatively mating with the second inner housing half 172.

Adjacent the mating end 178 of the first inner housing half 170 are a pair of longitudinal slots 184 configured to hold a pair of fiber optic connectors 56. The fiber optic connectors 56 are inserted in a side-by-side orientation, extending out forwardly from the mating end 178 of the first inner housing half 170. The longitudinal slots 184 are configured to align the fiber optic connectors 56 with the fiber optic adapter 50 of the first hybrid connector 12 when the two hybrid connectors 12, 14 are mated. The interior 176 of the body 174 of the first inner housing half 170 may accommodate optical slack storage.

The first inner housing half 170 defines a forwardly protruding tab 186 at the mating end 178 of the first inner housing half 170. The tab 186 is located on a first side 188 of the body 174. The tab 186 is configured to mate with the recess 64 defined on the body 36 of the first inner housing half 32 of the female hybrid fiber/copper connector 12 to act as a keying feature when the second hybrid fiber/copper connector 14 is mated to the first hybrid fiber/copper connector 12. In this manner, the correct orientation of the mating ends of the first and second connectors 12, 14 are obtained when the two hybrid connectors 12, 14 are mated. As will be discussed below, the second inner housing half 172 of the male hybrid fiber/copper connector 14 also includes a forwardly extending tab 190 that aligns with the tab 186 of the first inner housing half 170. The two tabs 186, 190 together form a large tab that engages the large recess defined on the combined inner housings 32, 34 of the female hybrid connector 12. The two tabs 186, 190 also act to protect the fiber optic connectors 56 as the tabs 186, 190 extend alongside of the fiber optic connectors 56.

Figure 57:
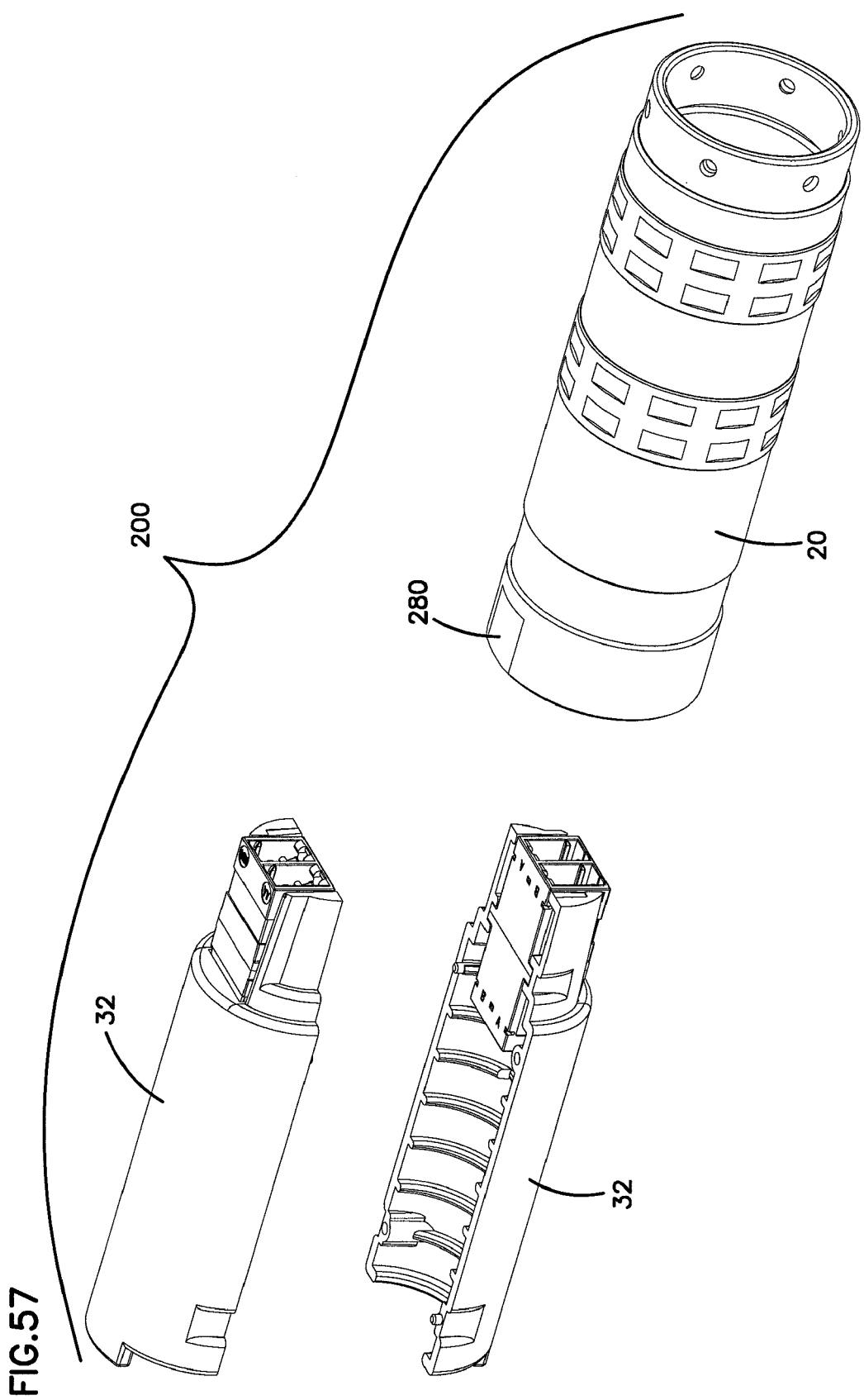
FIG. 57 illustrates a first quad fiber connector to be assembled by mounting together two of the first inner housing halves of FIG. 5.
Figure 58:
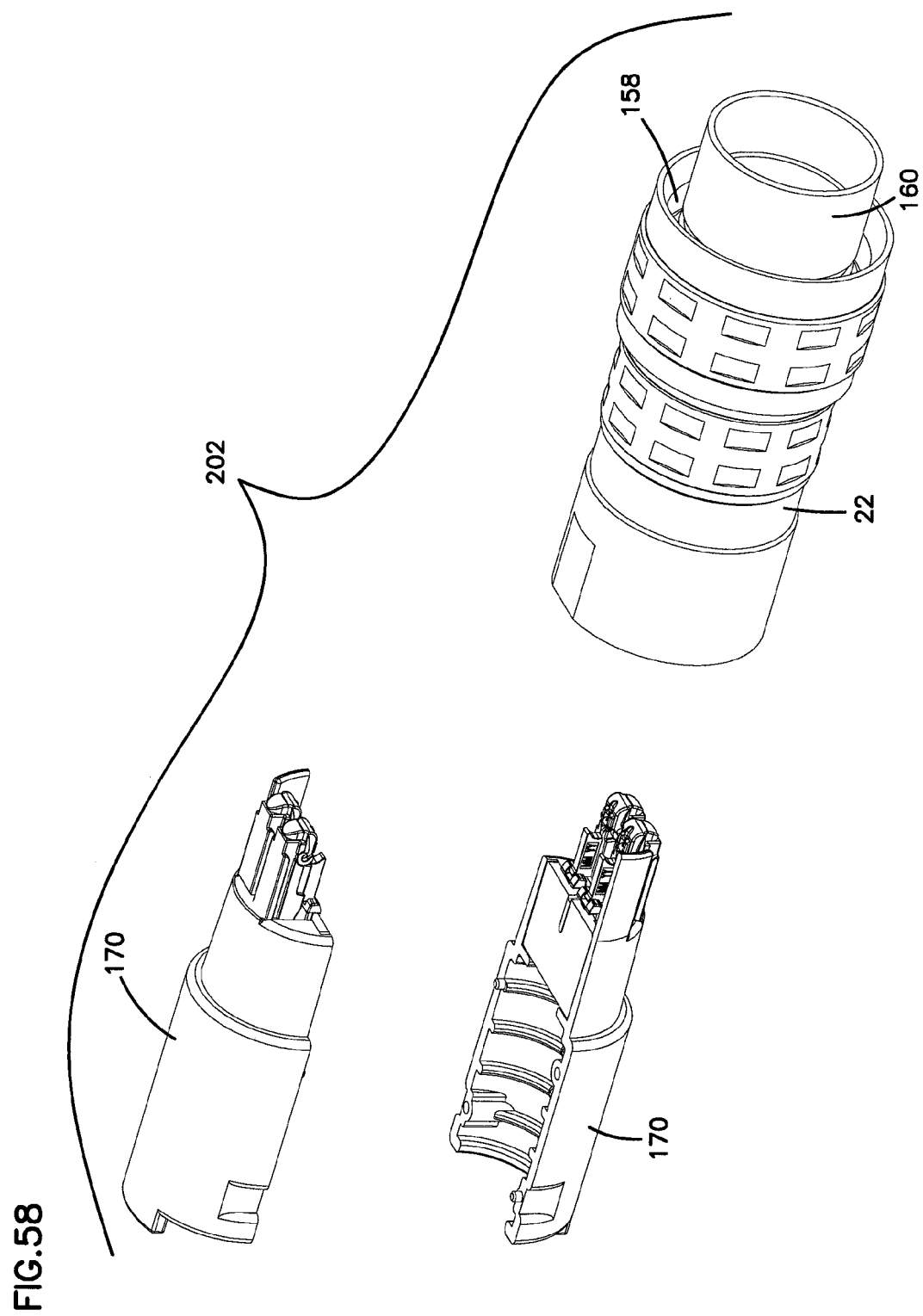
FIG. 58 illustrates a second quad fiber connector to be assembled by mounting together two of the first inner housing halves of FIG. 34, the second quad fiber connector configured to mate with the first quad fiber connector of FIG. 57.

A connector retainer 192 configured to be placed over the fiber optic connectors 56 is shown in FIGS. 39-42. The connector retainer 192 includes a generally flat body 194 that is adapted to lie flush with the upper face of the first inner housing half 170. It should be noted that all of the components of the inner housing halves 32, 34, 170, 172 are configured to lie flush with the upper faces of the inner housing halves 32, 34, 170, 172 so that different inner housing halves such as two first inner housing halves 32, 170 (of either the first or the second hybrid fiber/copper connector) or two second inner housing halves 34, 172 (of either the first or the second hybrid fiber/copper connector) can be mated to form different kinds of connectors. Two such examples have been shown in FIGS. 57 and 58, wherein two first inner housing halves 32 of a female hybrid fiber/copper connector 12 have been joined to form the female end of a quad fiber optic connector 200 and two first inner housing halves 170 of a male hybrid fiber/copper connector 14 have been mated to form the male end of a quad fiber optic connector 202 that is to mate with the female quad fiber connector 200. Other combination configurations are certainly possible since all of the inner components are mounted flush with the upper faces of the inner housing halves 32, 34, 170, 172.

Still referring to FIGS. 39-42, the connector retainer 192, as depicted, includes a pair of downwardly extending tabs 196 that are received into recesses 198 formed on the first inner housing half 170 to frictionally hold the connector retainer 192. The connector retainer 192 includes a longitudinal slot 193 at the front end for accommodating a separator wall 191 that separates the two fiber optic connectors 56. The longitudinal slot 193 allows the connector retainer 192 to lie flush with the inner housing half upper face.

Underneath the connector retainer 192, on each side of the longitudinal slot 193, is a pair of ramped tabs 195. The ramped tabs 195 are configured to hold down the cantilever snap fit structures 197 of the fiber optic connectors 56 such that the fiber optic connectors 56 do not lock into the fiber optic adapters 50 when the male and female hybrid connectors 12, 14 are mated. Please refer to U.S. Pat. No. 5,883,995, the entire disclosure of which has been incorporated herein by reference, for further description of the fiber optic connector 56 depicted and the interlocking mechanism of the fiber optic connector 56 and the fiber optic adapter 50.

The fiber optic connectors 56 that are inserted directly into the first inner housing half 170 of the male hybrid fiber/copper connector 14 or that are connected to the fiber optic adapter 50 within the first inner housing half 32 of the female hybrid fiber/copper connector 12 are terminated to the optical fibers of a hybrid fiber/copper cable segment. In certain embodiments, the optical fibers of the cable segment may be terminated to the ferrules of the fiber optic connectors 56 as known in the art.

In other embodiments, the fiber optic connectors 56 may be field-terminable. As such, the fiber optic connectors 56 may be provided with a preterminated fiber stub that can be heat-spliced in the field using a V-groove for aligning the fiber stub from the connector 56 and the optical fiber coming from the hybrid cable. In certain other embodiments, the fiber optic connectors 56 may be provided as part of an insert that includes the V-groove, wherein optical fibers coming from the hybrid cable may be spliced to the fiber stubs in the field utilizing the V-groove for alignment. An example field termination method is described in further detail in U.S. Pat. No. 6,811,323, the entire disclosure of which is incorporated herein by reference. Although heated epoxy may be used, other known techniques for field-splicing the optical fiber ends can be utilized.

FIGS. 43-47 illustrate the second inner housing half 172 of the second hybrid fiber/copper connector 14. The second inner housing half 172 is configured to house the copper components of the second, male, hybrid fiber/copper connector 14. As shown, the second inner housing half 172 includes an elongated body 204 defining an interior 206. The body 204 includes a mating end 207 and a cable receiving end 208. Similar to the first inner housing half 170, the second inner housing half 172 includes a pair of alignment pins 210 and a pair of pin openings 212 for cooperatively mating with the corresponding pins 182 and openings 183 of the first inner housing half 170.

Adjacent the mating end 207 of the second inner housing half 172 is an integrally formed conductor pin support 214. The conductor pin support 214 defines four channels 216 for nesting four conductive pins 218. The conductive pins 218 are shown in the cross-sectional view in FIG. 47 which is taken along line 47-47 of FIG. 46. As depicted, each of the four conductive pins 218 includes a female end 220 and a forwardly protruding male end 222. The conductive pins 218 are generally permanently mounted within the pin support 214 and form a part of the second inner housing half 172.

As in the first inner housing half 170, at the mating end 206 of the second inner housing half 172, there is a tab 190 protruding forwardly defined on a first side 226 of the body 204. The tab 190 is configured to mate with the recess 88 defined on the body 68 of the second inner housing half 34 of the female hybrid fiber/copper connector 12 to act as a keying feature when the second hybrid fiber/copper connector 14 is mated to the first hybrid fiber/copper connector 12. In this manner, the correct orientation of the mating ends of the first and second connectors 12, 14 are obtained when the two hybrid connectors 12, 14 are mated. The tab 190 aligns with the tab 186 of the first inner housing half 170 to form a large tab. The large tab engages the large recess defined on the combined inner housings of the female hybrid fiber/copper connector 12. As discussed above, the two tabs 186, 190 also act to protect the fiber optic connectors 56 as the tabs 186, 190 extend alongside of the fiber optic connectors 56.

It should also be noted that, if two first inner housing halves 170 or if two second inner housing halves 172 of a male hybrid fiber/copper connector 14 are mated to form, for example, a quad fiber optic connector 202, the tabs 186 will be positioned diagonally from each other and not aligned vertically with each other. Please see FIG. 58. This provides a keying feature for mating with, for example, a connector formed from two first inner housing halves 32 or two second inner housing halves 34 of a female hybrid fiber/copper connector 12. Please see FIG. 57. The recesses 64 on the female hybrid fiber/copper connector 12 also become positioned diagonally such that the tabs 186 of a quad male 202 can only be mated with the recesses 64 of another mating quad female connector 200. Please see FIGS. 57 and 58 for the keying feature.

Still referring to FIGS. 43-47, the body 204 of the second inner housing half 172 includes an exterior circumferential groove 230. The body 204 also defines opposing slots 232 positioned at each end of the circumferential groove 230. The circumferential groove 230 and the slots 232, as discussed above, accommodate a strength member that might be a part of a hybrid cable terminated to the male hybrid connector 14.

Figure 49:
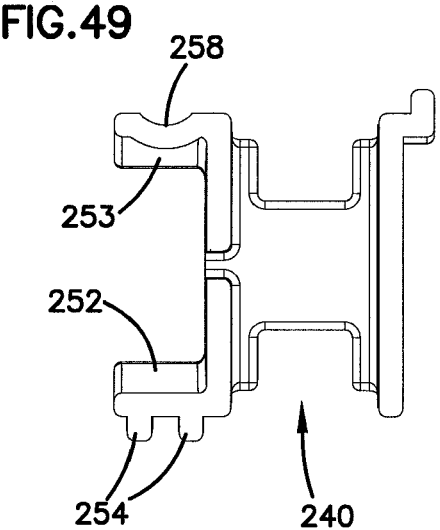
FIG. 49 is a top view of the conductor mount retainer of FIG. 48.
Figure 50:
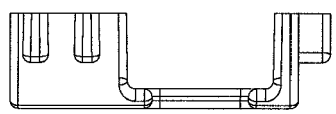
FIG. 50 is a side view of the conductor mount retainer of FIG. 48.
Figure 51:
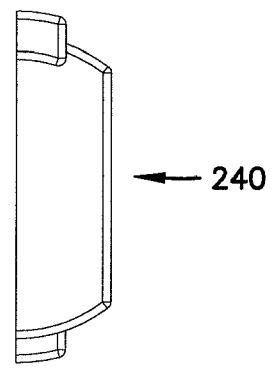
FIG. 51 is a rear end view of the conductor mount retainer of FIG. 48.

The interior 206 of the second inner housing half 172 is configured to receive a conductor mount that is identical to the conductor mount 96 shown in FIGS. 16-18. The forward ends 102 of the conductive pins 100 are adapted to be inserted within the channels 216 defined by the pin support 214 at the mating end 207 of the second inner housing half 172. As shown in FIG. 49, the conductor mount 96 is inserted into a recess 234 in the interior 206 of the body 204 and slid forwardly toward the pin support 214 until the conductive pins 100 physically and electrically mate with the female ends 220 of the conductive pins 218 that are in the channels 216 of the pin support 214. The male ends 222 of the conductive pins 218 protrude out for electrically mating with the female ends 86 of the conductive pins 84 of the female hybrid fiber/copper connector 12.

As in the female hybrid fiber/copper connector 12, the rear ends 106 of the conductive pins 100 are exposed through openings 108 defined on the conductor mount 96. The rear ends 106 of the conductive pins 100 are terminated to copper wires of a hybrid fiber/copper cable, just as in the female hybrid fiber/copper connector 12. And, since the conductor mount 96 can be removed from the second inner housing half 172 of the second hybrid fiber/copper connector 14 (i.e., male gender connector) and reinserted into the second inner housing half 34 of the first hybrid fiber/copper connector 12 (i.e., female gender connector), the gender of the hybrid connector 14 can be converted.

The conductor mount 96 is retained within the second inner housing half 172 by a conductor mount retainer 240 shown in FIGS. 48-51. The conductor mount retainer 240 is similar to the conductor mount retainer 110 of FIGS. 19-23. However, the conductor mount retainer 240 is shaped for insertion into the male gender hybrid fiber/copper connector 14. As shown, the conductor mount retainer 240 includes an elongated body 242 with a front portion 244, a rear portion 246 and a middle portion 248. The front portion 244 defines a U-shaped body 250 with a pair of forwardly extending legs 252, 253. The first leg 252 defines a pair of flanges 254 on the side of the leg 252. The flanges 252 are configured to receive a rib 256 on the interior 207 of the second inner housing half 172 for holding the conductor mount retainer 240 with a friction fit within the body 204. The second leg 253 defines a curved portion 258 for accommodating the alignment pin opening 212 defined in the second inner housing half 172.

Figure 53:
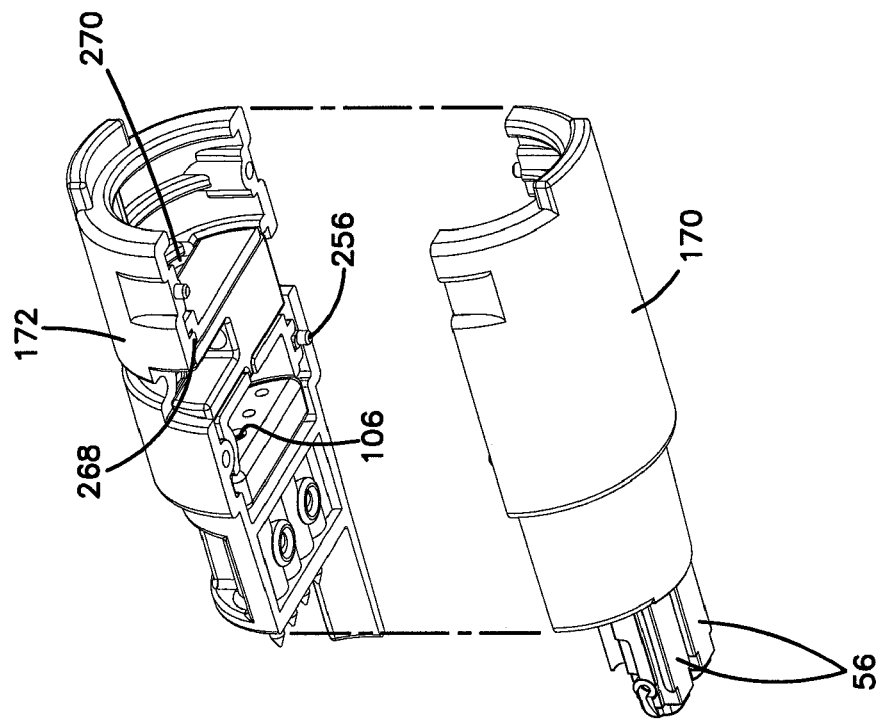
FIG. 53 illustrates a bottom perspective view of the first inner housing half and the second inner housing half of the second hybrid fiber/copper connector of FIG. 33 in a partially assembled configuration.

The middle portion 248 of the conductor mount retainer 240 includes a recess 260 for receiving a strength member clamp. The strength member clamp used in the male hybrid fiber/copper connector 14 is the same clamp 132 illustrated in FIGS. 24-27. The middle portion 248 of the conductor mount retainer 240 defines a slot 262 for receiving the tab 136 of the strength member clamp 132 for proper orientation of the clamp 132. As shown in FIG. 53, the strength member clamp 132 is inserted into the recess 260 of the middle portion 248 of the conductor mount retainer 240 so as to lie flush with the upper face of the second inner housing half 172.

As shown in FIG. 53, along with a tab 264 at the rear portion of the conductor mount retainer 240, the strength member clamp 132 defines a recess 266 for receiving a second rib 268 located in the interior 207 of the body 204 of the second inner housing half 172.

As in the female hybrid fiber/copper connector 12, the strength member is inserted through an opening 270 created between the body 204 of the second inner housing half 172 and the rear portion of the conductor mount retainer 240. The strength member is, then, guided downwardly between the arms 142 of the strength member clamp 132 and then upwardly and around the circumferential groove. Once the strength member has wrapped around the circumferential groove 230, it is received into the throughhole 138 of the strength member clamp 132 at the opposite side of the arms 142 and comes out of the throughhole 138 of the strength member clamp 132. It is crimped in the pocket 144 defined between the arms 142.

Figure 52:
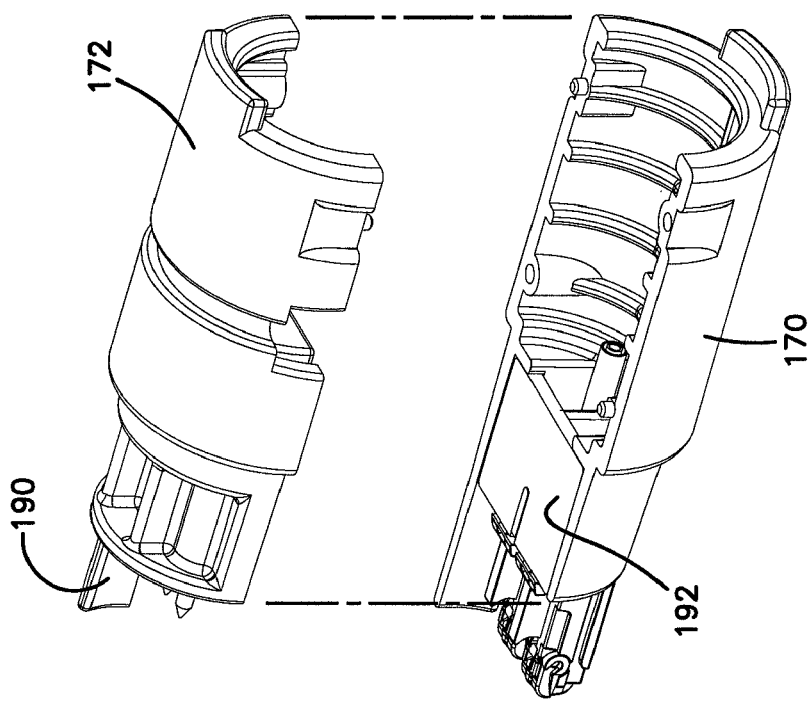
FIG. 52 illustrates a top perspective view of the first inner housing half and the second inner housing half of the second hybrid fiber/copper connector of FIG. 33 in a partially assembled configuration, the first inner housing half and the second inner housing half configured to be removably mounted together to form an inner connector assembly of the second hybrid fiber/copper connector of FIG. 33.

In FIGS. 52 and 53, the first and second inner housing halves 170, 172 are shown with the interior components inserted into the first and second inner housing halves 170, 172. As shown, the first inner housing half 170 receives a pair of fiber optic connectors 56 which may be terminated to the optical fibers of a hybrid fiber/copper cable. These fiber optic connectors 56 are retained by the connector retainer 192 and the cantilever snap fit structures 197 are held down to prevent locking of the fiber optic connectors 56 within the fiber optic adapter 50 of the female hybrid fiber/copper connector 12. These fiber optic connectors 56, just like the conductor mount 96 of the second inner housing half 172, may be removed from the first inner housing half 170 of the male hybrid fiber/copper connector 14 and remounted within a first housing half 32 of a female hybrid fiber/copper connector 12 (to the fiber optic adapters therein), to convert the gender of the hybrid fiber/copper connector 14. Such a female gender connector 12 and the two inner housing halves are shown in FIG. 4.

Figure 54:
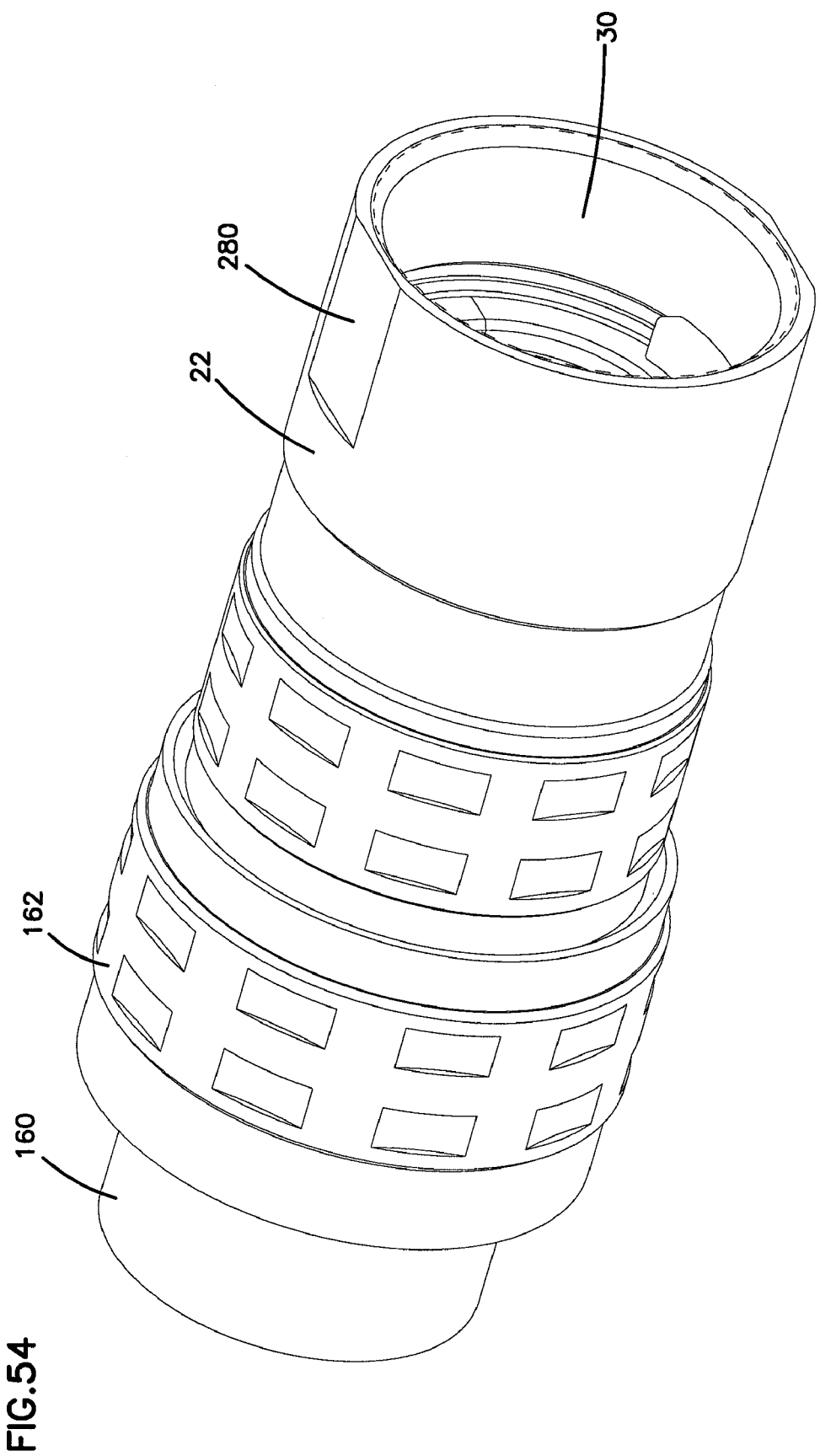
FIG. 54 illustrates an outer housing of the second hybrid fiber/copper connector of FIG. 33, the outer housing configured to receive the first and second inner housing halves of FIGS. 52-53.
Figure 55:
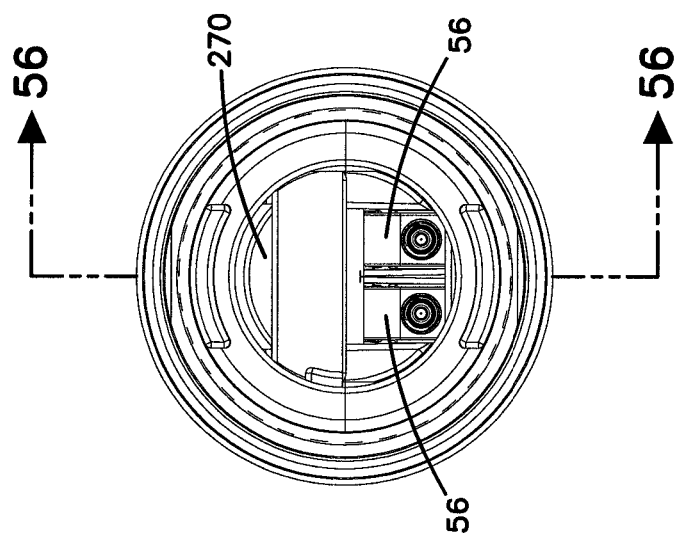
FIG. 55 illustrates a rear end view of the second hybrid fiber/copper connector of FIG. 33, the second hybrid fiber/copper connector shown in a fully assembled configuration.
Figure 56:
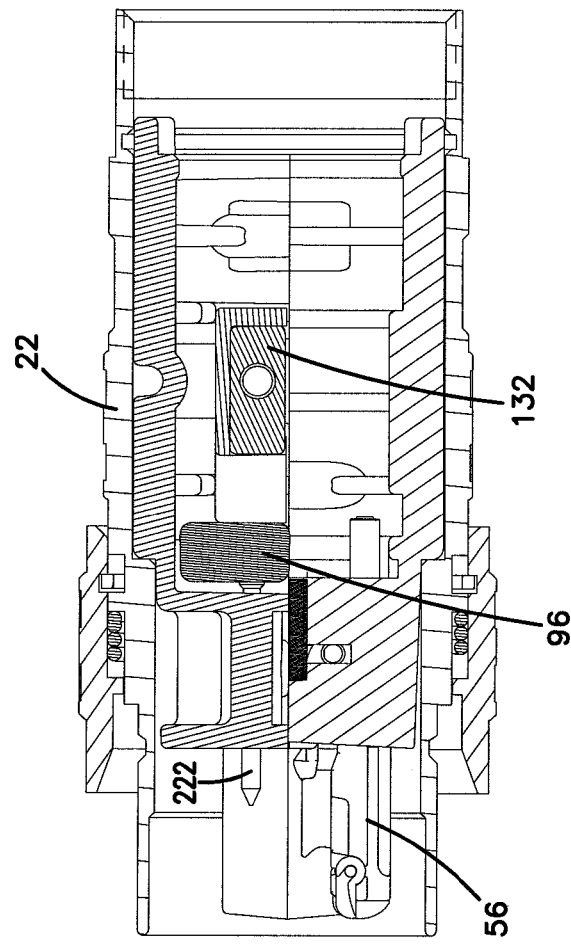
FIG. 56 is a cross-sectional view taken along line 56-56 of FIG. 55.

FIG. 54 illustrates the outer housing 22 of the second hybrid fiber/copper connector 14. As discussed before, once the first and the second housing halves 170, 172 are joined, the inner connector assembly 18 is slidably inserted into the outer housing 22 from a cable receiving end 30. FIGS. 55-56 show the first and second inner housing halves 170, 172 of the second hybrid fiber/copper connector 14 placed into the outer housing 22 of the second hybrid fiber/copper connector 14.

When the outer housings 20, 22 of the two hybrid connectors are coupled, a sliding ring 162 of the outer housing 22 of the second hybrid fiber/copper connector 14 is slid over the mating end 154 and the ball bearings 156 of the outer housing 20 of the first hybrid connector 12 to hold the two hybrid fiber/copper connectors 12, 14 in a mated configuration. The sliding locking ring 162 of the outer housing 22 of the second hybrid fiber/copper connector 14 and the recess 158 for receiving the ball bearings 156 is illustrated in FIGS. 1-3 and 54. In FIGS. 1 and 2, the sliding ring 162 is shown as having been slid over the ball bearings 156 of the outer housing 20 of the first hybrid fiber/copper connector 12. The sliding ring 162 is spring biased toward a locking position to hold the ball bearings 156 against the recess 158 on the intermediate circumferential wall 160 of the outer housing 22 of the second hybrid fiber/copper connector 14.

As discussed previously for the female hybrid fiber/copper connector 12, before the hybrid cable is to be terminated to the inner connector assembly 18 of the second hybrid fiber/copper connector 14, the hybrid cable is inserted through an end cap cable clamp 26. As depicted, the cable clamps 24, 26 and the cable receiving ends 28, 30 of the outer housings 20, 22 of the hybrid connectors include wrench flat portion with a plurality of opposing wrench flats 280 to aid the assembly of cable clamps 24, 26 to outer the housings 20, 22. As shown on FIGS. 2-3, 30, and 54, the cable receiving ends 28, 30 of the outer housings 20, 22 may be threaded to receive and engage the cable clamps 24, 26.

In another embodiment of the hybrid fiber/copper connector assembly, instead of being provided to connect two cable segments, the first hybrid fiber/copper connector 12 or the second hybrid fiber/copper connector 14 can be provided as part of a bulkhead configuration such as seen in FIGS. 8-11 of U.S. Patent Application Publication Nos. US 2006/0056769 A1 and US 2006/0233496 A1, the entire disclosures of which have been incorporated herein by reference.

In one embodiment of a bulkhead version of the hybrid fiber/copper connector assembly, the outer housings of the first and second hybrid fiber/copper connectors may be provided with mounting flanges such as shown in FIGS. 8-11 of U.S. Patent Application Publication Nos. US 2006/0056769 A1 and US 2006/0233496 A1, for mounting the hybrid fiber/copper connectors to a bulkhead. Openings defined through the flanges receive removable fasteners such as screws which engage fastener openings of the bulkhead.

The bulkhead may form part of any equipment, such as a camera, an enclosure, a cabinet, a panel, etc. Cables from within, for example, a camera or any other equipment, of which the bulkhead may form part of, enter into the cable receiving end of the hybrid fiber/copper connectors. The hybrid cable, which will have terminated thereto fiber optic connectors 56 and a conductor mount 96, is coupled to the inner housing halves of the hybrid fiber/copper connectors as described above for the first and second hybrid fiber/copper connectors 12, 14. It should be noted that the connector protruding out from the bulkhead may be a female hybrid fiber/copper connector such as connector 12 or it may be a male hybrid fiber/copper connector such as connector 14. One embodiment of a bulkhead female hybrid fiber/copper connector is shown in FIGS. 65-70 and one embodiment of a bulkhead male hybrid fiber/copper connector is shown in FIGS. 71-76.

When a female hybrid fiber/copper connector is used with the bulkhead, the fiber optic connectors 56 terminated to a hybrid cable coming from within the bulkhead equipment may be connected to the fiber optic adapters 50 inside the first inner housing half of the first hybrid fiber/copper connector. The conductor mount 96 that is terminated to the hybrid cable coming from within the bulkhead equipment may be directly inserted into the second inner housing half of the female hybrid fiber/copper connector and mate with the pins 84 within the pin support 80.

In assembling the bulkhead versions, the same steps can be followed as described above for the non bulkhead versions of the female hybrid fiber/copper connector 12. Once assembled, the female bulkhead hybrid fiber/copper connector will be ready to mate with a male hybrid fiber/copper connector 14 such as shown in FIG. 33 of the present disclosure.

If a male hybrid fiber/copper connector is used with the bulkhead, the fiber optic connectors 56 terminated to a hybrid cable coming from within the bulkhead equipment are directly inserted into the first inner housing half of the second (i.e., male) hybrid fiber/copper connector. The conductor mount 96 that is terminated to the hybrid cable coming from within the bulkhead equipment is directly inserted into the second inner housing half of the female hybrid fiber/copper connector and mates with the pins 218 within the pin support 214.

In assembling the bulkhead version, the same steps can be followed as described above for the non bulkhead versions of the male hybrid fiber/copper connector 14. Once assembled, the male bulkhead hybrid fiber/copper connector will be ready to mate with a female hybrid fiber/copper connector 12 such as shown in FIG. 4 of the present disclosure.

Since both hybrid connectors 12, 14 are constructed in modular form with removable portions, repair or replacement of a damaged component is achieved. It is known for one or more information carrying elements within a hybrid cable or the connectors terminating these elements (such as fiber optic connectors and pin conductors) to be damaged, necessitating repair or replacement of the hybrid fiber/copper connector assembly. While replacement is possible and is the common response to damage, this solution requires a camera operator to carry an entire spare assembly. Alternatively, to repair a damaged termination, either connector of cable segment could be removed and that cable segment could be reterminated. However, retermination is time consuming and is difficult to accomplish in the field, where the damage is likely to occur while using the camera. Assembly of the present invention is constructed to permit individual elements of cable or terminations of these elements to be replaced in the field by a camera operator with simple tools and does not require that the camera operator carry an extensive array of replacement items.

For example, if one of the fiber strands within cable in cable segment becomes damaged, and the camera operator can identify the damaged strand, the camera operator may loosen the cable clamp, remove the first and second inner housing halves 32, 34 from the outer housing 20 of, for example, the first hybrid fiber/copper connector 12. With interior of the inner connector assembly 16 exposed, the fiber connector 56 terminating the damaged fiber may be removed from adapter 50 within the first inner housing half 32 and moved to one side. A replacement fiber segment, such as a patch cord including ends terminated with fiber optic connectors 56 may be used.

A similar process may be followed to replace a damaged copper pin conductor.

Figures 59, 60:
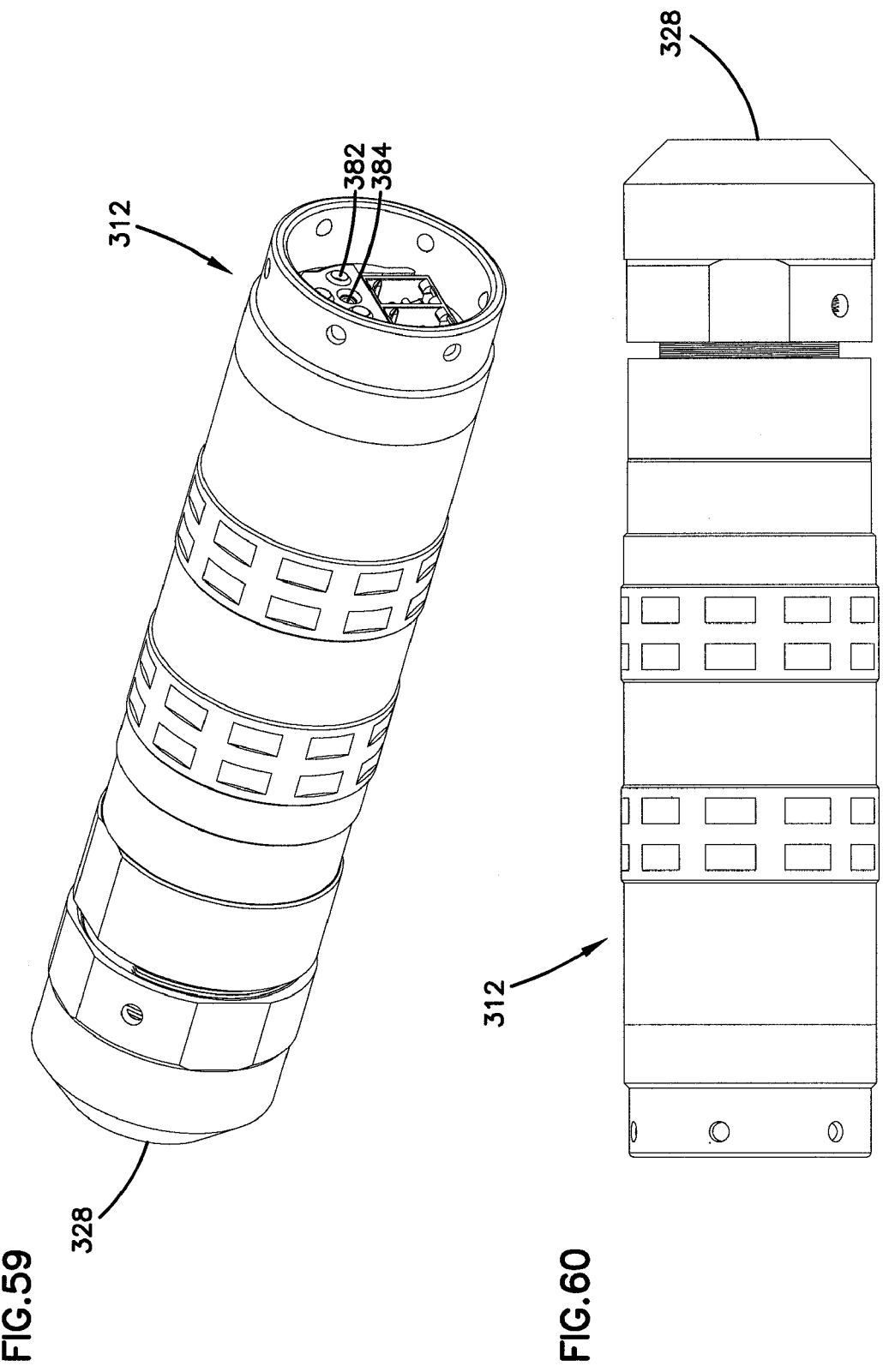
FIG. 59 is a perspective view of a second embodiment of a first hybrid fiber/copper connector that is configured to be a part of an assembly similar to the hybrid fiber/copper connector assembly of FIGS. 1-3.
FIG. 60 is a side view of the second embodiment of the first hybrid fiber/copper connector of FIG. 59.
Figure 61:
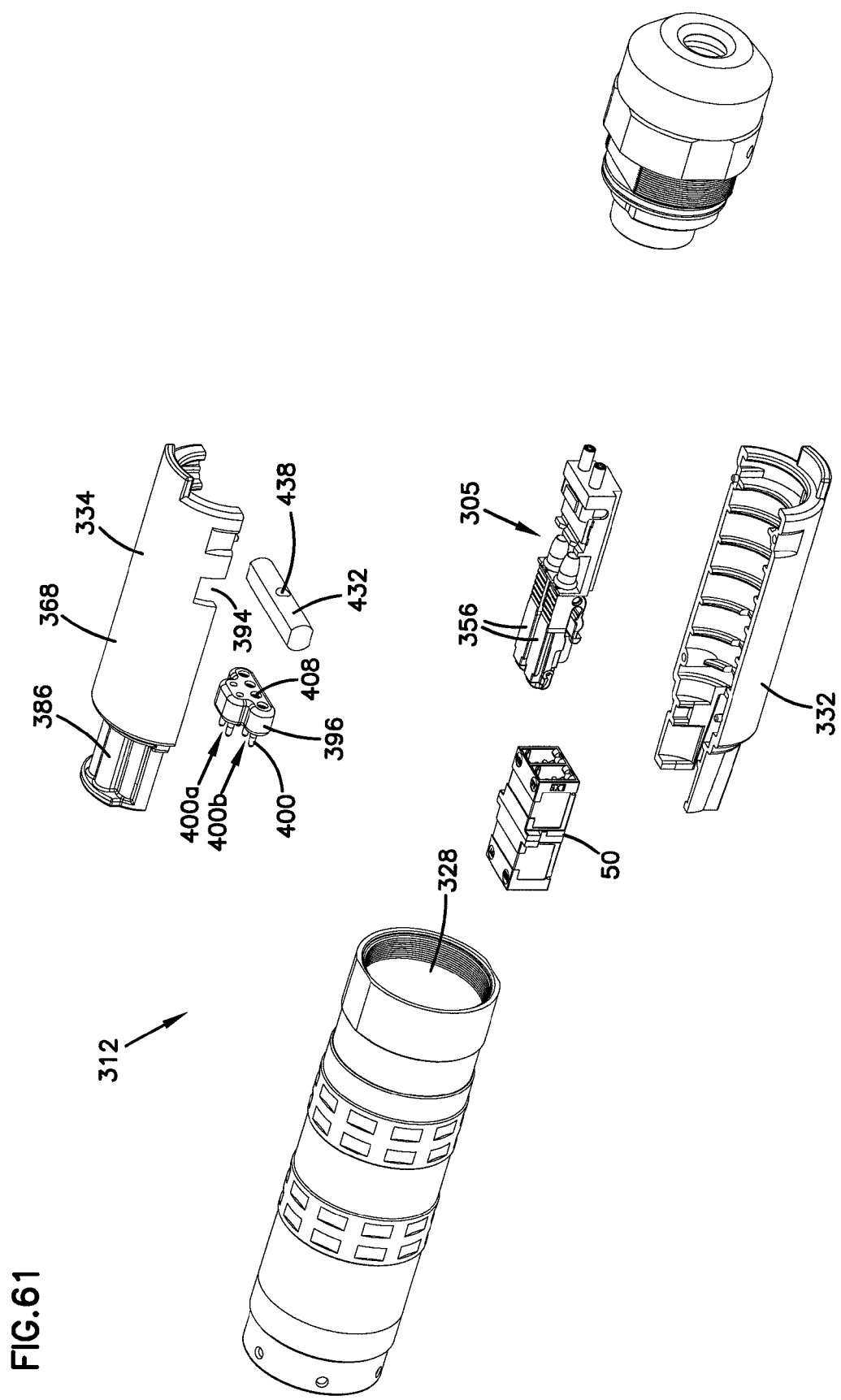
FIG. 61 is an exploded perspective view of the second embodiment of the first hybrid fiber/copper connector of FIG. 59.

Referring now to FIGS. 59-61, a second embodiment of a first (i.e., female gender) hybrid fiber/copper connector 312 that is configured to be a part of an assembly similar to the hybrid fiber/copper connector assembly 10 of FIGS. 1-3 is shown. The second embodiment of the female hybrid fiber/copper connector 312 is similar in configuration to the first embodiment of the first hybrid fiber/copper connector 12 shown in FIG. 4, except for a number of differences that will be discussed below.

As discussed previously, in certain embodiments, the fiber optic connectors 56 that are used with the different male and female hybrid fiber/copper connectors may be field terminable. Referring to FIG. 61, the second embodiment of the female hybrid fiber/copper connector 312 is shown with one example of a field terminable fiber optic connector assembly 305. The field terminable fiber optic assembly 305 shown in FIG. 61 is described in further detail in Patent Application 61/079,732, entitled "FIELD TERMINABLE FIBER OPTIC CONNECTOR ASSEMBLY", filed concurrently herewith on the same day, the entire disclosure of which is incorporated herein by reference. As noted above, a field terminable fiber optic connector assembly may also be used with the first embodiment of the female hybrid fiber/copper connector 12.

The field terminable fiber optic connector assembly 305 is formed as an insert that may be inserted into the first inner housing half 332 of the female hybrid fiber/copper connector 312. The first inner housing half 332 of the second embodiment of the female hybrid fiber/copper connector 312 has been specifically configured to receive the field terminable fiber optic connector assembly 305 shown. The fiber optic connectors 356 of the field terminable fiber optic connector assembly 305 are configured to mate with the fiber optic adapter 50 located within the first inner housing half 332.

As discussed previously, a field terminable fiber optic connector assembly allows a damaged fiber to be repaired in the field using heat splicing.

It should be noted that the second embodiment of the female hybrid fiber/copper connector 312 is not limited to use with the field terminable fiber optic connector assembly 305 shown in FIG. 61 and that it can also house fiber optic connectors whose ferrules have been preterminated to optical fibers of a cable at the factory setting, such as the fiber optic connectors 56 shown in FIG. 28.

As discussed above, the second embodiment of the female hybrid fiber/copper connector 312 includes a number of differences from the first embodiment 12. One difference lies in the configuration of the strength member clamp. The body 368 of the second inner housing half 334 of the second embodiment of the female hybrid fiber/copper connector 312 includes a slot 394 for receiving a strength member clamp bar 432. The bar 432 includes a throughhole 438 that is configured to receive a strength member of a cable. Once the strength member of a cable is received from a cable receiving end 328 of the female hybrid fiber/copper connector 312, the strength member is inserted through the hole 438 of the bar 432 and is crimped at opposite side of the hole 438. Once the strength member is inserted through the hole 438, the strength member may be crimped to the bar in a number of different ways including crimping a crimp ball (e.g., made out of stainless steel in one embodiment) to the end of the strength member that is larger than the hole 438 of the bar 432. In this manner, removal of the strength member from the bar 432 is prevented. In certain embodiments, the bar 432 may be made from metallic materials and may provide a grounding path to the strength member. In one embodiment, the bar 432 is made from stainless steel. According to one embodiment, the strength member clamp bar 432 depicted herein is rated to hold 225 lbs. of force for about 5 minutes.

Another difference between the second embodiment of the female hybrid fiber/copper connector 312 and the first embodiment 12 lies in the configuration of the conductor mount 396. The conductor mount 396 includes six forwardly protruding conductive pins 400. The lower layer of conductive pins 400b may be power pins and the upper layer 400a of conductive pins may be communications pins. As discussed above, when used in a broadcast camera environment, one of the optical fibers of the hybrid connector may be used to transmit video and related audio signals to the camera and the second optical fiber may be used to transmit video and audio captured by the camera to the production facility or some other location. Four of the copper conductors may be used to provide power to operate the camera, while the other two of copper conductors may be used to provide communications between the production facility and the camera operator. The number of fiber strands and copper conductors extending within the hybrid cable may be varied as required to support the desired usage and communication bandwidth of the camera and the hybrid connectors disclosed herein may be configured accordingly.

The second inner housing half 334 of the second embodiment of the female hybrid fiber/copper connector 312 includes an integrally formed conductor pin support 380 that is configured to mate with the conductor mount 396. The conductor pin support 380 defines six channels 382 which include six conductive pins 384 within the channels 382. The forward ends of the conductive pins 400 of the conductor mount 396 are adapted to be inserted into the channels 382 defined by the pin support 380. The conductor mount 396 is removably inserted into the body 368 of the second inner housing half 334 of the second embodiment of the female hybrid fiber/copper connector 312 and slid forwardly toward the pin support 380 until electrical connection is established. Unlike the first embodiment of the female hybrid fiber/copper connector 12, the second embodiment 312 does not include a conductor mount retainer 110. The conductor mount 396 is held within the body 368 of the second inner housing half 334 by friction.

The rear ends of the conductive pins are exposed through openings 408 defined on the conductor mount 396. The rear ends of the conductive pins 400 are terminated to copper wires of a hybrid fiber/copper cable. Since the conductor mount 396 is a removable piece, the conductor mount 396 can be removed from the second inner housing half 334 of the first hybrid fiber/copper connector 312 (i.e., female gender connector) and reinserted into the second inner housing of the second hybrid fiber/copper connector (i.e., male gender connector) 314 as part of the conversion of the genders of the hybrid connectors 312, 314.

Figure 64:
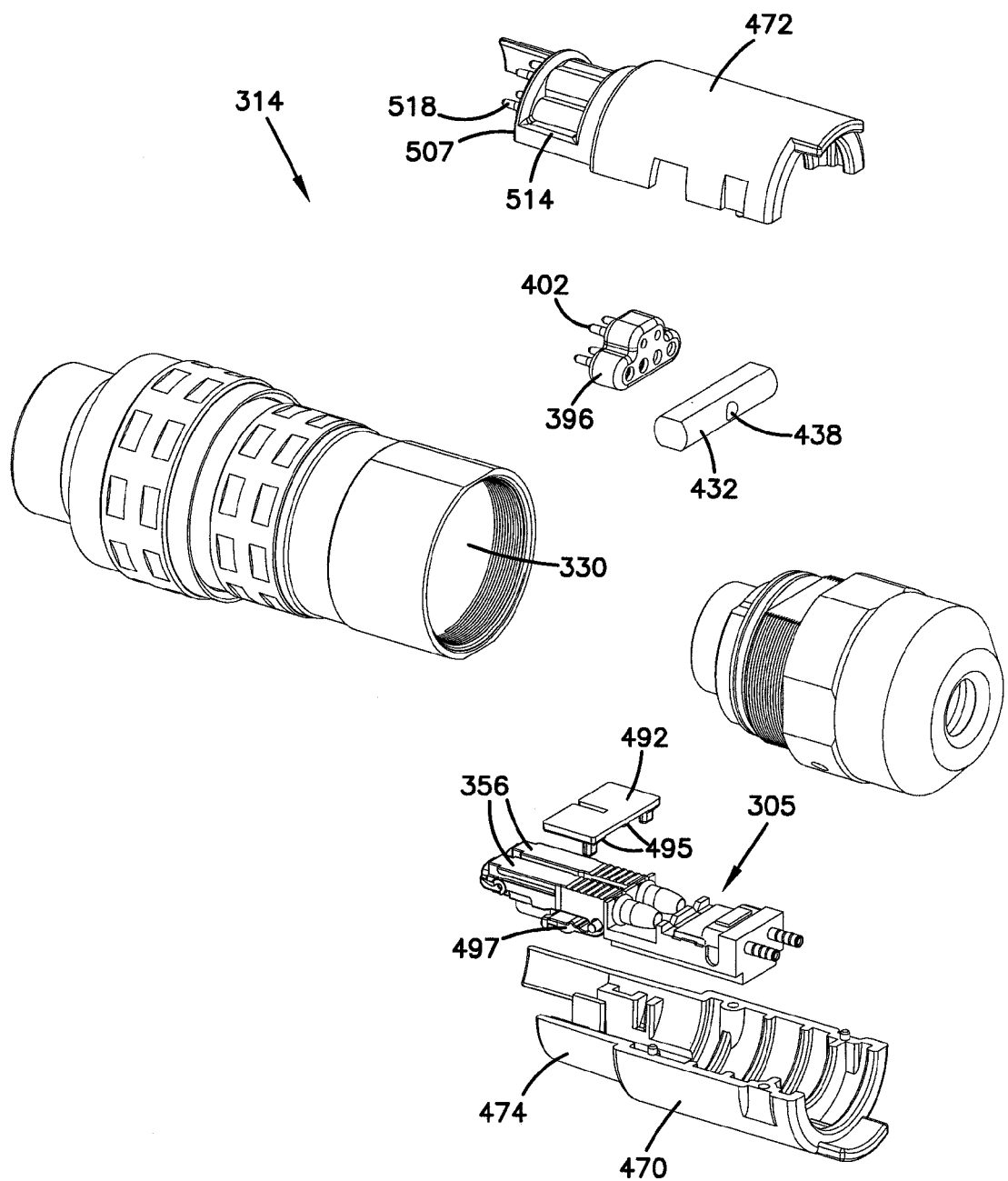
FIG. 64 is an exploded perspective view of the second embodiment of the second hybrid fiber/copper connector of FIG. 62.

Referring now to FIGS. 62-64, the second embodiment of a second (i.e., male gender) hybrid fiber/copper connector 314 that is configured to mate with the second embodiment of the female hybrid fiber/copper connector 312 of FIGS. 59-61 to form an assembly similar to the hybrid fiber/copper connector assembly 10 of FIGS. 1-3 is shown. The second embodiment of the male hybrid fiber/copper connector 314 is similar in configuration to the first embodiment of the male hybrid fiber/copper connector 14 shown in FIG. 33, except for a number of differences.

In FIG. 64, the second embodiment of the male hybrid fiber/copper connector 314 is shown with the field terminable fiber optic connector assembly 305, discussed in further detail in Patent Application 61/079,732, entitled "FIELD TERMINABLE FIBER OPTIC CONNECTOR ASSEMBLY", filed concurrently herewith on the same day, the entire disclosure of which is incorporated herein by reference.

As noted above, a field terminable fiber optic connector assembly may also be used with the first embodiment of the male hybrid fiber/copper connector 14.

The field terminable fiber optic connector assembly 305 is formed as an insert that may be inserted into the first inner housing half 470 of the male hybrid fiber/copper connector 314. The first inner housing half 470 of the second embodiment of the male hybrid fiber/copper connector 314 has been specifically configured to receive the field terminable fiber optic connector assembly 305 shown. A connector retainer 492 is placed over the fiber optic connectors 356 once the field terminable fiber optic connector assembly 305 is placed within the first inner housing half 470, as shown in FIG. 64. When the second embodiment of the male hybrid fiber/copper connector 314 is mated to the second embodiment of the female hybrid fiber/copper connector 312 shown in FIGS. 59-61, the fiber optic connectors 356 of the field terminable fiber optic connector assembly 305 mate with the fiber optic adapter 50 located within the first inner housing half 332 of the female hybrid fiber/copper connector 312.

It should be noted that the second embodiment of the male hybrid fiber/copper connector 314 is not limited to use with the field terminable fiber optic connector assembly 305 shown in FIG. 64 and that it can also house fiber optic connectors whose ferrules have been preterminated to optical fibers of a cable at the factory setting, such as the fiber optic connectors 56 shown in FIG. 33.

As shown in FIG. 64, the fiber optic connectors 356 are mounted within the first inner housing half 470 of the second embodiment of the male hybrid fiber/copper connector 314 in an upside down orientation as compared to the first embodiment 14. However, as in the first embodiment 14, the connector retainer 492 of the second embodiment 314 also includes ramped tabs 495 underneath thereof. The ramped tabs 495 press against the bottom side of the fiber optic connectors 356 and cause the cantilever snap fit structures 497 at the opposite side to be flexed against the body 474 of the first inner housing half 470. In this manner, when the fiber optic connectors 356 of the field terminable fiber optic connector assembly 305 are coupled to a fiber optic adapter 50 (e.g., of the female hybrid fiber/copper connector), the fiber optic connectors 356 do not lock into the fiber optic adapter 50.

As discussed above, the second embodiment of the male hybrid fiber/copper connector 314 includes a number of differences from the first embodiment 14.

Referring to FIG. 64, as in the female counterpart, one difference lies in the configuration of the strength member. The strength member clamp in the form of a bar 432 with a hole 438 is used. As in the female counterpart, once the strength member of a cable is received from a cable receiving end 330 of the male hybrid fiber/copper connector 314, the strength member is inserted through the hole 438 of the bar 432 and is crimped at opposite side of the hole 438 with a crimp ball (e.g., made out of stainless steel).

Still referring to FIG. 64, the second inner housing half 472 of the second embodiment of the male hybrid fiber/copper connector 314 is configured to receive a conductor mount that is identical to the conductor mount 396 shown in FIG. 61. Thus, the integrally formed pin support 514 adjacent the mating end 507 of the second inner housing half 472 is configured to receive the forward ends 402 of the six conductive pins 400 of the conductor mount 396. The six conductive pins 400 of the conductor mount 396 establish an electrical connection with the conductive pins 518 within the conductor pin support 514. Each of the conductive pins 518 includes a female end and forwardly protruding male end and are generally permanently mounted within the pin support 514.

Again, as in the second embodiment of the female hybrid fiber/copper connector 312, the second embodiment of the male hybrid fiber/copper connector 314 does not include a conductor mount retainer. The conductor mount 396 is held within the body 504 of the second inner housing half 472 by friction.

Since the conductor mount 396 is a removable piece, the conductor mount 396 can be removed from the second inner housing half 472 of the male hybrid fiber/copper connector 314 and reinserted into the second inner housing 334 of the female hybrid fiber/copper connector 312 as part of the conversion of the genders of the hybrid connectors 312, 314.

As noted previously, instead of being provided to connect two cable segments, the female hybrid fiber/copper connector or the male hybrid fiber/copper connector can be provided as part of a bulkhead configuration such as seen in FIGS. 8-11 of U.S. Patent Application Publication Nos. US 2006/0056769 A1 and US 2006/0233496 A1, the entire disclosures of which have been incorporated herein by reference.

The bulkhead may form part of any equipment, such as a camera, an enclosure, a cabinet, a panel, etc. Cables from within, for example, a camera or any other equipment, of which the bulkhead may form part of, enter into the cable receiving end of the hybrid fiber/copper connectors. The hybrid cable, which will have terminated thereto fiber optic connectors and a conductor mount, is coupled to the inner housing halves of the hybrid fiber/copper connectors as described above for the first and second hybrid fiber/copper connectors. It should be noted that the connector protruding out from the bulkhead may be a female hybrid fiber/copper connector or it may be a male hybrid fiber/copper connector.

Referring to FIGS. 65-70, one embodiment of a bulkhead female hybrid fiber/copper connector 612 is shown. The bulkhead female hybrid connector 612 includes a bulkhead mounting panel 609, an outer housing 620, a first inner housing half 632, and a second inner housing half 634. The first inner housing half 632 is configured to hold the fiber components of the bulkhead female connector 612 while the second inner housing half 634 is configured to hold the electrical/copper components of the bulkhead female connector 612. The first and the second inner housing halves 632, 634 detachably mate together and are inserted into the outer housing 620 of the bulkhead female hybrid fiber/copper connector 612. After insertion, the outer housing 620 is fastened to the bulkhead mounting panel 609. The bulkhead mounting panel 609 includes fastener holes 607 for mounting to a bulkhead.

As shown in FIG. 67, the outer housing 620 includes a mating end 754 and a cable receiving end 628. A grounding spring 605 is inserted into the outer housing 620. The grounding spring 605 is configured to make contact with the outer housing 22 of a male hybrid fiber/copper connector 14 for grounding the entire hybrid assembly. As shown in the cross-sectional view in FIG. 70, the grounding spring 605 is inserted within a circumferential recess 604 of the interior of the outer housing 620. The interior surface of the grounding spring 605 makes contact with the exterior surface of the intermediate circumferential wall 160 of the outer housing 22 of a male hybrid connector 14 for establishing a grounding pathway between the two outer housings 620, 22.

After the first and second inner housing halves 632, 634 are inserted into the outer housing 620 from the cable receiving end 628, the cable receiving end 628 is inserted through an opening 603 in the panel 609 and fastened to the panel 609 with a nut 601. A grounding ring 611 is captured between the nut 601 and the panel 609 as the outer housing 620 is fastened to the panel 609. The outer housing 620 includes a circumferential flange portion 613 that is configured to capture an o-ring 615 against the panel 609 for providing a watertight seal. The o-ring 615 is shown in the cross-sectional view in FIG. 70.

As shown in FIG. 67, the cable receiving end 628 of the outer housing 620 and the opening 603 of the panel 609 may include intermating flats for keying purposes.

The mating end 754 of the outer housing 620 is preferably configured to mate with the outer housing 22 of the male hybrid fiber/copper connector 14 shown in FIG. 54. As such, the mating end 754 of the outer housing 620 includes a plurality of circumferentially arranged ball bearings 756 that are configured to engage a circumferential recess 158 defined on an intermediate circumferential wall 160 of the outer housing 22 of the male hybrid fiber/copper connector 14. When the outer housing 620 of the bulkhead female hybrid connector 612 is coupled to the outer housing 22 of the male hybrid connector 14, the sliding ring 162 of the outer housing 22 of the male hybrid fiber/copper connector 14 is slid over the mating end 754 and the ball bearings 756 of the outer housing 620 of the bulkhead female hybrid connector 612 to hold the two hybrid fiber/copper connectors in a mated configuration. The sliding locking ring 162 of the outer housing 22 of the male hybrid fiber/copper connector 14 and the recess 158 for receiving the ball bearings 756 is illustrated in FIGS. 1-3 and 54. The sliding ring 162 is spring biased toward a locking position to hold the ball bearings 756 against the recess 158 on the intermediate circumferential wall 160 of the outer housing 22 of the male hybrid fiber/copper connector 14.

The cable receiving end 628 of the bulkhead female hybrid connector 612 is configured to threadingly receive an end cap 624. A hybrid cable segment that includes preterminated fiber optic connectors and also copper conductors may be inserted through the end cap 624 to mate with the fiber and copper components of the bulkhead female hybrid connector 612, as will be discussed below.

Still referring to FIG. 67, the first inner housing half 632 of the bulkhead female hybrid fiber/copper connector 612 includes a body 636 with a fiber optic adapter 50 removably mounted to the body 636. The fiber optic adapter 50 may be mounted to the body 636 in the same manner as in the first inner housing half 32 of the female hybrid connector 12 of FIGS. 4-9. The fiber optic adapter 50 mounted to the first housing half 632 is illustrated in FIG. 10. As depicted, the fiber optic adapter 50 is a duplex adapter including a front end and a rear end. Two fiber optic connectors mounted into the front end of the fiber optic adapter 50 can optically mate with two fiber optic connectors mounted into the rear end of the fiber optic adapter 50. As depicted, the adapter 50 is configured to receive and optically connect two pairs of LX.5 type connectors. Other connector and adapter formats can also be used.

Still referring to FIG. 67, the body 636 includes a mating end 640 and a cable receiving end 642. The first inner housing half 632 defines alignment features for cooperatively mating with the second inner housing half 634 of the bulkhead female hybrid connector 612. The mating end 640 of the body 636 of the first inner housing half 632 includes an exterior recessed portion 664 defined on a first side 666 of the body 636. The recessed portion 664 is configured to act as a keying feature when a male hybrid fiber/copper connector 14 is mated to the bulkhead female hybrid fiber/copper connector 612. In this manner, the correct orientation of the mating ends of the bulkhead female and the male hybrid connectors 612, 14 are obtained when the two hybrid connectors are mated.

The second inner housing half 634 is configured to house the copper components of the bulkhead female hybrid fiber/copper connector 612. The second inner housing half 634 includes a body 668 with a mating end 672 and a cable receiving end 674. The second inner housing half 634 includes an alignment pin 676 and a pin opening 678 for cooperatively mating with a corresponding pin and opening of the first inner housing half 632.

The second inner housing half 634 includes an integrally formed conductor pin support 680 adjacent the mating end 672. The conductor pin support 680 defines six channels 682. The channels 682 include therein six conductive pins 684. Each of the six conductive pins 684 includes two female ends. The conductive pins 684 are generally permanently mounted within the pin support 680 and form a part of the second inner housing half 634.

As in the first inner housing half 632, the second inner housing half 634 defines an exterior recessed portion 688 on a first side 690 of the pin support 680. The recess 688 is configured align with the recess 664 of the first inner housing half 632 when the two housing halves 632, 634 are joined to define a big recess. The big recess acts as a keying feature when the bulkhead female hybrid fiber/copper connector 612 is mated to a male hybrid fiber/copper connector 14 such that the correct orientation of the mating ends of the two hybrid connectors are obtained.

The cable receiving end of the body 674 of the second inner housing half 634 is configured to receive a removable conductor mount. The conductor mount is identical to the conductor mount 396 shown in FIGS. 61 and 64. The conductor mount 396 includes six forwardly protruding conductive pins 400. The forward ends of the conductive pins 400 are adapted to be inserted within the channels 682 defined by the pin support 680 at the mating end 672 of the second inner housing half 634. The conductor mount 396 is removably inserted into a recess 704 in the interior 670 of the body 668 and slid forwardly toward the pin support 680. The conductor mount 396 is slid until the conductive pins 400 physically and electrically mate with the rear female ends of the conductive pins 684 in the channels 682 of the pin support 680.

Referring to FIG. 66, the rear ends 406 of the conductive pins 400 are exposed through openings 408 defined on the conductor mount 396. The rear ends 406 of the conductive pins 400 may be terminated to copper wires of a hybrid fiber/copper cable. Since the conductor mount 396 is a removable piece, the conductor mount 396 can be removed from the second inner housing half 634 of the bulkhead female hybrid fiber/copper connector 612 and reinserted into a second inner housing 772 of a bulkhead male hybrid fiber/copper connector 614, as will be discussed further below. In this manner, the gender of a bulkhead hybrid connector may be changed.

In FIGS. 65, 66, and 68-70, the bulkhead female hybrid connector 612 is shown in an assembled configuration. The fiber optic adapter 50 in the first inner housing half 632 is configured to receive a pair of fiber optic connectors 56 which may be terminated to the optical fibers of a hybrid fiber/copper cable. During a gender conversion, the fiber optic connectors 56, just like the conductor mount 396 of the second inner housing half 634, may be removed from the fiber optic adapter 50 and from the first inner housing half 632 and remounted within a first housing half of a bulkhead male hybrid fiber/copper connector 614, to convert the gender of the bulkhead hybrid fiber/copper connector. An example of such a male gender bulkhead connector 614 having two male inner housing halves is shown in FIGS. 71-76.

The second, male gender, bulkhead hybrid fiber/copper connector 614 is illustrated in an exploded configuration in FIG. 73. The bulkhead male hybrid fiber/copper connector 614 includes a bulkhead mounting panel 909, an outer housing 622, a first inner housing half 770, and a second inner housing half 772. As in the female counterpart, the first inner housing half 770 is configured to hold the fiber components of the bulkhead male connector 614 while the second inner housing half 772 is configured to hold the electrical/copper components of the bulkhead male connector 614. The first and the second inner housing halves 770, 772 detachably mate together and are inserted into the outer housing 622 of the bulkhead male hybrid fiber/copper connector 614. After insertion, the outer housing 622 is fastened to the panel 909.

As shown in FIG. 73, the outer housing 622 includes a mating end 900 and a cable receiving end 630. The cable receiving end 630 includes threads 901. After the first and second inner housing halves 770, 772 are inserted into the outer housing 622 from the cable receiving end 630, the cable receiving end 630 is inserted through an opening 902 in the panel 909 and fastened to the panel 909 with a nut 903. A grounding ring 904 is captured between the nut 903 and the panel 909 as the outer housing 622 is fastened to the panel 909. An o-ring 905 is captured between a circumferential flange portion 906 of the outer housing 622 and the panel 909 for providing a watertight seal. The o-ring 905 is shown in the cross-sectional view in FIG. 76. An end cap 626 is threadingly mated to the cable receiving end 630 of the outer housing 622 of the bulkhead male hybrid fiber/copper connector 614.

As shown in FIG. 73, the cable receiving end 630 of the outer housing 622 and the opening 902 of the panel 909 may include intermating flats for keying purposes.

Figure 76:
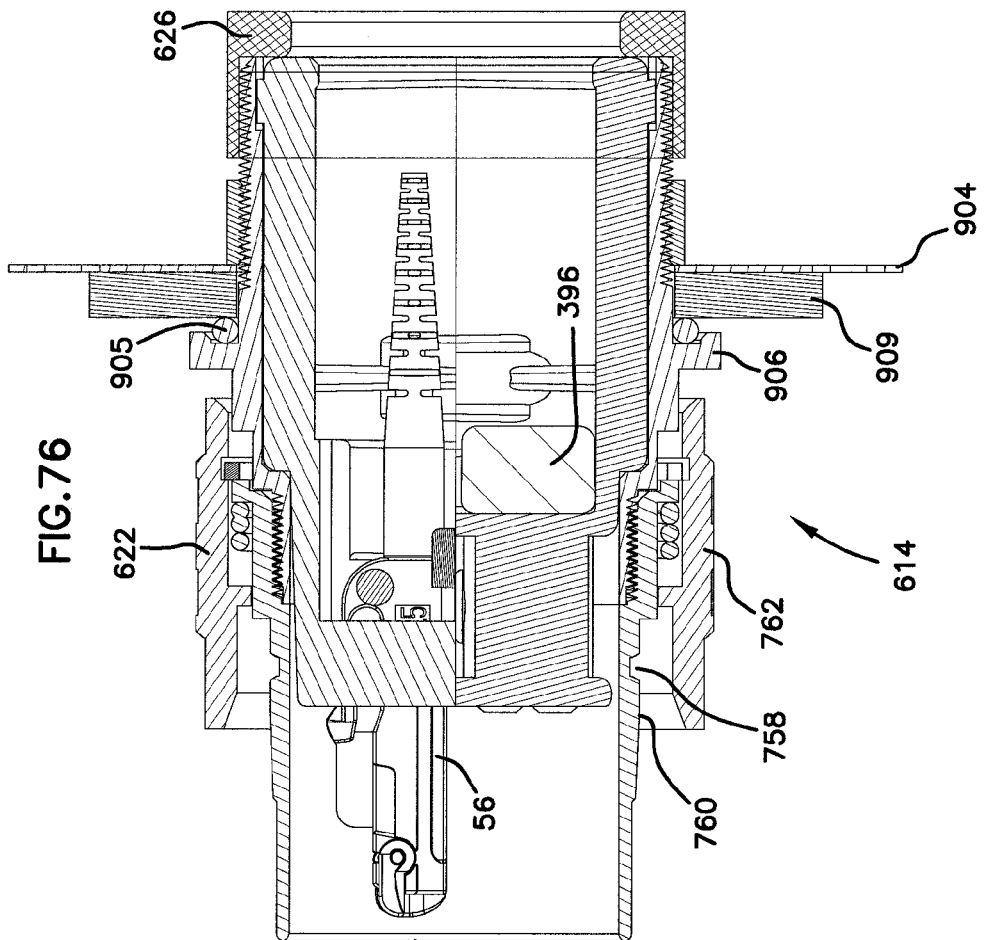
FIG. 76 is a cross-sectional view taken along line 76-76 of FIG. 72.
Figure 70:
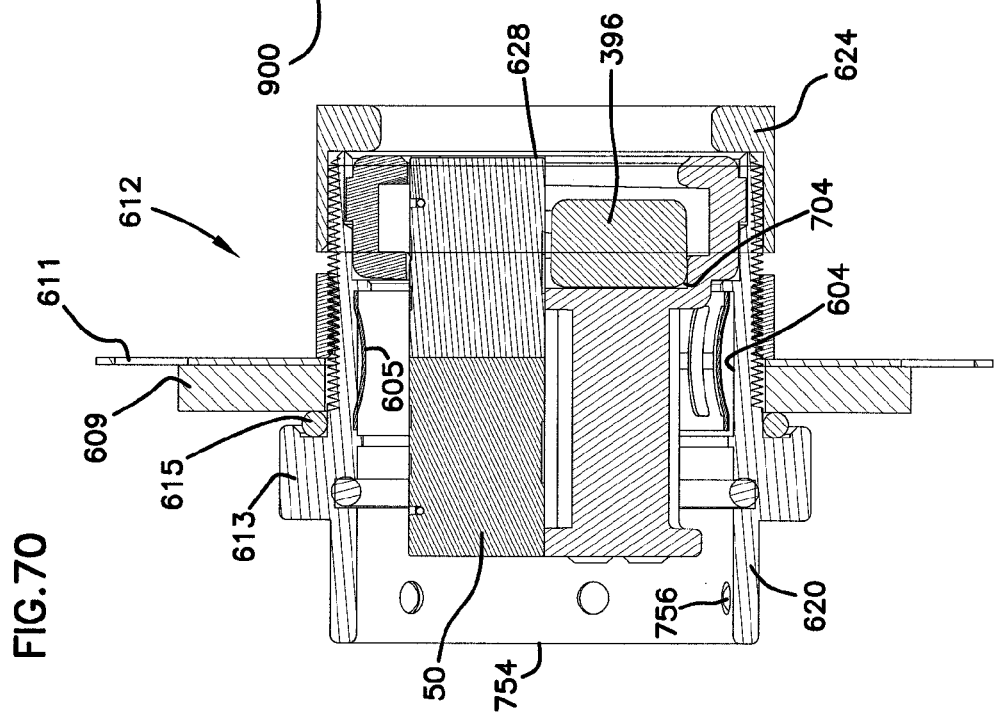
FIG. 70 is a cross-sectional view taken along line 70-70 of FIG. 65.

The mating end 900 of the outer housing 622 is configured to mate with the outer housing 20 of the female hybrid fiber/copper connector 12 shown in FIG. 30. Referring to FIG. 76, when the outer housing 20 of the female hybrid fiber/copper connector 12 is coupled to the outer housing 622 of the bulkhead male hybrid connector 614, a sliding ring 762 of the outer housing 622 of the bulkhead male hybrid fiber/copper connector 614 is slid over the mating end 154 and the ball bearings 156 of the outer housing 20 of the female hybrid connector 12 to hold the two hybrid fiber/copper connectors in a mated configuration. The sliding ring 762 is spring biased toward a locking position to hold the ball bearings 156 against a recess 758 on an intermediate circumferential wall 760 of the outer housing 622 of the bulkhead male hybrid fiber/copper connector 614.

Now referring to FIG. 73, as in the bulkhead female hybrid fiber/copper connector 612, the first inner housing half 770 of the bulkhead male hybrid connector 614 is configured to hold the fiber components of the connector while the second inner housing half 772 is configured to hold the electrical/copper components of the connector. The first inner housing half 770 includes an elongated body 774 defining an interior 776 including a mating end 778 and a cable receiving end 780. The first inner housing half 770 defines an alignment pin 782 and a pin opening 783 for cooperatively mating with the second inner housing half 772.

Adjacent the mating end 778 of the first inner housing half 770 are a pair of longitudinal slots 784 configured to hold a pair of fiber optic connectors 56. The fiber optic connectors 56 are shown in FIG. 76. It should be noted that the first inner housing half 770 may receive either factory preterminated fiber optic connectors or may be configured to receive an insert in the form of a field terminable fiber optic connector assembly, as shown in FIG. 64. In the depicted embodiment, the first inner housing half 770 is configured to receive factory preterminated fiber optic connectors 56. The fiber optic connectors 56 are inserted in a side-by-side orientation, extending out forwardly from the mating end 778 of the first inner housing half 770. The longitudinal slots 784 are configured to align the fiber optic connectors 56 with a fiber optic adapter 50 of a female hybrid connector 12 when the two hybrid connectors are mated.

Still referring to FIG. 73, the first inner housing half 770 defines a forwardly protruding tab 786 at the mating end 778 of the first inner housing half 770. The tab 786 is located on a first side 788 of the body 774. The tab 786 is configured to mate with the recess 64 defined on the body 36 of the first inner housing half 32 of a female hybrid fiber/copper connector 12 to act as a keying feature when the bulkhead male hybrid fiber/copper connector 614 is mated to a female hybrid fiber/copper connector 12. In this manner, the correct orientation of the mating ends are obtained when the two hybrid connectors are mated. As will be discussed below, the second inner housing half 772 of the bulkhead male hybrid fiber/copper connector 614 also includes a forwardly extending tab 790 that aligns with the tab 786 of the first inner housing half 770. The two tabs 786, 790 together form a large tab that engages the large recess defined on the combined inner housings 32, 34 of a female hybrid connector 12. The two tabs 786, 790 also act to protect the fiber optic connectors 56 as the tabs 786, 790 extend alongside of the fiber optic connectors 56.

A connector retainer 792 configured to be placed over the fiber optic connectors 56 is shown in FIG. 73. The connector retainer 792 is similar in configuration to the connector retainer shown in FIGS. 33, 39-42, and 64 and performs the same function.

As noted above, the fiber optic connectors 56 that are inserted directly into the first inner housing half 770 of the bulkhead male hybrid fiber/copper connector 614 or that are connected to the fiber optic adapter 50 within the first inner housing half 632 of the bulkhead female hybrid fiber/copper connector 612 are terminated to the optical fibers of a hybrid fiber/copper cable segment. In certain embodiments, the optical fibers of the cable segment may be terminated to the ferrules of the fiber optic connectors as known in the art and in other embodiments, the fiber optic connectors may be field-terminable.

Referring back to FIG. 73, the second inner housing half 772 includes an elongated body 804 defining an interior 806. The body 804 includes a mating end 807 and a cable receiving end 808. Similar to the first inner housing half 770, the second inner housing half 772 includes an alignment pin and a pin opening for cooperatively mating with the corresponding pin 782 and opening 783 of the first inner housing half 770.

Adjacent the mating end 807 of the second inner housing half 772 is an integrally formed conductor pin support 814. The conductor pin support 814 defines six channels for nesting six conductive pins. Each of the six conductive pins includes a female end and a forwardly protruding male end. The conductive pins are generally permanently mounted within the pin support 814 and form a part of the second inner housing half 772.

As in the first inner housing half 770, at the mating end 807 of the second inner housing half 772, there is a tab 790 protruding forwardly defined on a first side 826 of the body 804. The tab 790 is configured to mate with the recess 88 defined on the body 68 of the second inner housing half 34 of a female hybrid fiber/copper connector 12 to act as a keying feature when the bulkhead male hybrid fiber/copper connector 614 is mated to a female hybrid fiber/copper connector 12. In this manner, the correct orientation of the mating ends are obtained when the two hybrid connectors are mated. The tab 790 aligns with the tab 786 of the first inner housing half to form a large tab. The large tab engages the large recess defined on the combined inner housings of a female hybrid fiber/copper connector 12. As discussed above, the two tabs 786, 790 also act to protect the fiber optic connectors 56 as the tabs extend 786, 790 alongside of the fiber optic connectors 56.

The interior 806 of the second inner housing half 772 is configured to receive a conductor mount that is identical to the conductor mount 396 shown in FIGS. 61 and 64. The forward ends 402 of the conductive pins 400 are adapted to be inserted within the channels defined by the pin support 814 at the mating end 807 of the second inner housing half 772. The conductor mount 396 is inserted into a recess in the interior 806 of the body 804 and slid forwardly toward the pin support 814 until the conductive pins 400 physically and electrically mate with the female ends of the conductive pins that are in the channels of the pin support 814. The male ends of the conductive pins protrude out for electrically mating with the female ends 86 of the conductive pins 84 of a female hybrid fiber/copper connector 12.

As in the bulkhead female hybrid fiber/copper connector 612, the rear ends 406 of the conductive pins 400 are exposed through openings 408 defined on the conductor mount 396. The rear ends 406 of the conductive pins 400 are terminated to copper wires of a hybrid fiber/copper cable, just as in the bulkhead female hybrid fiber/copper connector 612. And, since the conductor mount 396 can be removed from the second inner housing half 772 of the bulkhead male hybrid fiber/copper connector 614 and reinserted into the second inner housing half 634 of a bulkhead female hybrid fiber/copper connector 612, the gender of the bulkhead hybrid connector can be converted.

The first inner housing half 770 is configured to receive a pair of fiber optic connectors 56 which may be terminated to the optical fibers of a hybrid fiber/copper cable. The fiber optic connectors 56 are retained by the connector retainer 792 and the cantilever snap fit structures are pressed against the body of the first inner housing half 770 to prevent locking of the fiber optic connectors 56 within the fiber optic adapter 50 of a female hybrid fiber/copper connector 12. The fiber optic connectors (whether be factory terminated fiber optic connectors or fiber optic connectors that are part of a field terminable fiber optic connector assembly), just like the conductor mount 396 of the second inner housing half 772, may be removed from the first inner housing half 770 of the bulkhead male hybrid fiber/copper connector 614 and remounted within a first housing half 632 of a bulkhead female hybrid fiber/copper connector 612 (to the fiber optic adapter therein), to convert the gender of the bulkhead hybrid fiber/copper connector.

The above specification, examples and data provide a complete description of the manufacture and use of the inventive aspects of the present disclosure. Since many embodiments of the inventive aspects can be made without departing from the spirit and scope of the disclosure, the inventive aspects reside in the claims hereinafter appended.

What is claimed is:

1. A hybrid fiber/copper connector assembly comprising:
a first hybrid fiber/copper connector including a first outer housing with a mating end and a cable entry end and a first inner housing removably mounted within the first outer housing, the first inner housing formed from two inner housing halves removably mounted together; and a second hybrid fiber/copper connector including a second outer housing with a mating end that is adapted to mate with the mating end of the first hybrid fiber/copper connector and a cable entry end, the second hybrid fiber/copper connector including a second inner housing removably mounted within the second outer housing, the second inner housing formed from two inner housing halves removably mounted together;

wherein the first hybrid fiber/copper connector includes at least one fiber optic adapter removably mounted within one of the first inner housing halves adjacent the mating end and at least one electrical pin carried by a conductor mount that is removably mounted within the other of the first inner housing halves adjacent the mating end, the electrical pin of the removable conductor mount configured to make electrical contact with an electrical pin stationarily mounted within one of the first inner housing halves;

wherein the second hybrid fiber/copper connector includes a removable insert with at least one fiber optic connector and a V-groove chip, the fiber optic connector being a field-repairable fiber optic connector, the V-groove chip including a V-groove for aligning a first segment of optical fiber terminated to the fiber optic connector and a second segment of optical fiber coming from outside the hybrid fiber/copper connector assembly, the insert mounted within one of the second inner housing halves adjacent the mating end, the second hybrid fiber/copper connector also including at least one electrical pin conductor carried by a conductor mount that is removably mounted within the other of the second inner housing halves adjacent the mating end, the electrical pin of the removable conductor mount configured to make electrical contact with an electrical pin stationarily mounted within one of the second inner housing halves;

wherein the fiber optic connector of the second hybrid fiber/copper connector is configured to mate with the fiber optic adapter of the first hybrid fiber/copper connector and the electrical pin conductor carried by the removably mounted conductor mount of the second hybrid fiber/copper connector is adapted to electrically mate with the electrical pin conductor carried by the removably mounted conductor mount of the first hybrid fiber/copper connector.

2. The connector assembly of claim 1, wherein the electrical pin conductor carried by the removably mounted conductor mount of the second hybrid fiber/copper connector electrically mates with the electrical pin conductor carried by the removably mounted conductor mount of the first hybrid fiber/copper connector through the stationarily mounted electrical pins of the first and the second hybrid fiber/copper connectors.

3. The connector assembly of claim 1, wherein the fiber optic connector is an LX.5 format connector.

4. The connector assembly of claim 1, wherein the insert includes two fiber optic connectors and the V-groove chip includes two V-grooves for aligning segments of optical fiber terminated to each of the fiber optic connectors with segments of optical fiber coming from outside the connector assembly.

5. The connector assembly of claim 1, wherein the removably mounted conductor mounts of the first and second hybrid fiber/copper connectors are identically configured.

6. The connector assembly of claim 1, wherein each of the first and the second hybrid fiber/copper connectors includes a cable strength member clamp.

7. The connector assembly of claim 1, wherein each of the first and second hybrid fiber/copper connectors includes an end cap adapted to mate with the cable entry end of the outer housings, the end cap including a cable clamp with a through-hole for receiving a cable, the cable clamp configured to radially clamp the cable to the outer housings once the cable has been received through the hole of the end cap.

8. The connector assembly of claim 1, wherein the first segment of optical fiber terminated to the fiber optic connector and the second segment of optical fiber coming from outside the hybrid fiber/copper connector assembly are heat-spliced.

9. The connector assembly of claim 1, wherein the conductor mount carries six electrical pins.

10. The connector assembly of claim 1, wherein the inner housing halves of each of the first and the second hybrid fiber/copper connectors define an upper face, wherein when the fiber optic adapter, the fiber optic connector, or the removably mounted conductor mount are mounted to the inner housing halves, none of the fiber optic adapter, the fiber optic connector, or the removably mounted conductor mount protrudes past the upper face of the inner housing halves.

11. The connector assembly of claim 1, wherein the fiber optic adapter is a duplex adapter.

12. A hybrid fiber/copper connector comprising:
a first outer housing with a mating end and a cable entry end and a first inner housing removably mounted within the first outer housing, the first inner housing formed from a first inner housing half removably mounted to a second inner housing half;
at least one fiber optic adapter removably mounted within the first inner housing half adjacent the mating end;
an insert removably mounted within the first inner housing half adjacent the mating end, the insert including at least one fiber optic connector and a V-groove chip, the fiber optic connector being a field-repairable fiber optic connector that is mounted to the fiber optic adapter, the V-groove chip including a V-groove for aligning a first segment of optical fiber terminated to the fiber optic connector and a second segment of optical fiber coming from outside the hybrid fiber/copper connector; and
at least one electrical pin carried by a conductor mount that is removably mounted within the second inner housing half adjacent the mating end, the electrical pin of the removable conductor mount configured to make electrical contact with an electrical pin stationarily mounted within the second inner housing half.

13. The connector of claim 12, wherein the insert includes two fiber optic connectors and the V-groove chip includes two V-grooves for aligning segments of optical fiber terminated to each of the fiber optic connectors with segments of optical fiber coming from outside the hybrid fiber/copper connector.

14. The connector of claim 12, wherein the hybrid fiber/copper connector is configured to receive six electrical terminations.

15. The connector of claim 12, further comprising a cable strength member clamp.

16. The connector of claim 12, wherein the first segment of optical fiber terminated to the fiber optic connector and the second segment of optical fiber coming from outside the hybrid fiber/copper connector are heat-spliced.

17. A hybrid fiber/copper connector comprising:
a first outer housing with a mating end and a cable entry end and a first inner housing removably mounted within the first outer housing, the first inner housing formed from a first inner housing half removably mounted to a second inner housing half,
an insert removably mounted within the first inner housing half adjacent the mating end, the insert including at least one fiber optic connector and a V-groove chip, the fiber optic connector being a field-repairable fiber optic connector, the V-groove chip including a V-groove for aligning a first segment of optical fiber terminated to the fiber optic connector and a second segment of optical fiber coming from outside the hybrid fiber/copper connector; and
at least one electrical pin carried by a conductor mount that is removably mounted within the second inner housing half adjacent the mating end, the electrical pin of the removable conductor mount configured to make electrical contact with an electrical pin stationarily mounted within the second inner housing half.

18. The connector of claim 17, wherein the fiber optic connector is an LX.5 format fiber optic connector.

19. The connector of claim 17, wherein the insert includes two fiber optic connectors and the V-groove chip includes two V-grooves for aligning segments of optical fiber terminated to each of the fiber optic connectors with segments of optical fiber coming from outside the hybrid fiber/copper connector.

20. The connector of claim 17, wherein the hybrid fiber/copper connector is configured to receive six electrical terminations.

21. The connector of claim 17, further comprising a cable strength member clamp.

22. The connector of claim 17, wherein the first segment of optical fiber terminated to the fiber optic connector and the second segment of optical fiber coming from outside the hybrid fiber/copper connector are heat-spliced.

23. A method of assembling a hybrid fiber/copper connector comprising:
providing a first outer housing with a mating end and a cable entry end and a first inner housing removably mounted within the first outer housing;
removing the first inner housing from the first outer housing;
removing a fiber optic adapter from within the first inner housing;
removing an insert from the first inner housing by removing a fiber optic connector mounted on the insert from the fiber optic adapter, the insert including a V-groove chip, the V-groove chip including a V-groove for aligning a first segment of optical fiber terminated to the fiber optic connector and a second segment of optical fiber coming from outside the hybrid fiber/copper connector;
removing a conductor mount having electrical pins from electrical contact with electrical pins stationarily mounted within the first inner housing;
providing a second outer housing with a mating end and a cable entry end and a second inner housing removably mounted within the second outer housing;
mounting the insert including the fiber optic connector and the V-groove chip to the second inner housing; and
mounting the conductor mount having electrical pins within the second inner housing to make electrical contact with electrical pins stationarily mounted within the second inner housing.

24. A method of assembling a hybrid fiber/copper connector comprising:
providing a first outer housing with a mating end and a cable entry end and a first inner housing removably mounted within the first outer housing;
removing the first inner housing from the first outer housing;
removing an insert from the first inner housing, the insert including at least one fiber optic connector and a V-groove chip, the V-groove chip including a V-groove for aligning a first segment of optical fiber terminated to the fiber optic connector and a second segment of optical fiber coming from outside the hybrid fiber/copper connector;

removing a conductor mount having electrical pins from electrical contact with electrical pins stationarily mounted within the first inner housing;

providing a second outer housing with a mating end and a cable entry end and a second inner housing removably mounted within the second outer housing;

mounting a fiber optic adapter to the second inner housing;

mounting the at least one fiber optic connector of the insert having the V-groove chip to the fiber optic adapter within the second inner housing; and mounting the conductor mount having electrical pins within the second inner housing to make electrical contact with electrical pins stationarily mounted within the second inner housing.

25. A hybrid fiber/copper connector comprising:

a first outer housing with a mating end and a cable entry end and a first inner housing removably mounted within the first outer housing, the first outer housing removably mounted to an opening in a panel, the first inner housing formed from two inner housing halves removably mounted together, at least one fiber optic adapter removably mounted within one of the first inner housing halves adjacent the mating end;

an electrical pin stationarily mounted within the other of the first inner housing halves; and at least one electrical pin carried by a conductor mount that is removably mounted within the first inner housing adjacent the mating end, the electrical pin of the removable conductor mount configured to make electrical contact with the electrical pin stationarily mounted within one of the first inner housing halves.

26. The connector of claim 25, wherein the cable entry end of the first outer housing includes threads and the first outer housing is mounted to the panel by inserting the cable entry end of the first outer housing through the opening of the panel and threading a nut over the cable entry end of the first outer housing.

27. The connector of claim 25, wherein the first outer housing is sealed against the opening of the panel with an o-ring.

28. The connector of claim 25, wherein the at least one fiber optic adapter is a duplex adapter.

29. A hybrid fiber/copper connector comprising:

a first outer housing with a mating end and a cable entry end and a first inner housing removably mounted within the first outer housing, the first outer housing removably mounted to an opening in a panel, the first inner housing formed from two inner housing halves removably mounted together, at least one fiber optic connector removably mounted within one of the first inner housing halves adjacent the mating end; and an electrical pin stationarily mounted with the other of the first inner housing halves; and at least one electrical pin carried by a conductor mount that is removably mounted within the first inner housing adjacent the mating end, the electrical pin of the removable conductor mount configured to make electrical contact with the electrical pin stationarily mounted within one of the first inner housing halves.

30. The connector of claim 29, wherein the cable entry end of the first outer housing includes threads and the first outer housing is mounted to the panel by inserting the cable entry end of the first outer housing through the opening of the panel and threading a nut over the cable entry end of the first outer housing.

31. The connector of claim 29, wherein the first outer housing is sealed against the opening of the panel with an o-ring.

32. The connector of claim 29, wherein two fiber optic connectors are removably mounted within one of the first inner housing halves.

\* \* \* \* \*

UNITED STATES PATENT AND TRADEMARK OFFICE
CERTIFICATE OF CORRECTION

PATENT NO. : 7,490,994 B2 Page 1 of 1
APPLICATION NO. : 11/787197
DATED : February 17, 2009
INVENTOR(S) : Scadden et al.

It is certified that error appears in the above-identified patent and that said Letters Patent is hereby corrected as shown below:

Col. 17, line 24: "61/079,732," should read --11/735,267,--

Col. 19, line 4: "61/079,732," should read --11/735,267,--

Signed and Sealed this

Ninth Day of March, 2010

David J. Kappos
*Director of the United States Patent and Trademark Office*